United States Patent
Nakao

(10) Patent No.: US 10,150,824 B2
(45) Date of Patent: Dec. 11, 2018

(54) FILM-FORMING AUXILIARY

(71) Applicant: NIPPON SHOKUBAI CO., LTD., Osaka-shi, Osaka (JP)

(72) Inventor: Kanji Nakao, Suita (JP)

(73) Assignee: NIPPON SHOKUBAI CO., LTD., Osaka-shi (JP)

( * ) Notice: Subject to any disclaimer, the term of this patent is extended or adjusted under 35 U.S.C. 154(b) by 302 days.

(21) Appl. No.: 15/034,463

(22) PCT Filed: Nov. 6, 2014

(86) PCT No.: PCT/JP2014/079400
§ 371 (c)(1),
(2) Date: May 4, 2016

(87) PCT Pub. No.: WO2015/068751
PCT Pub. Date: May 14, 2015

(65) Prior Publication Data
US 2016/0280814 A1  Sep. 29, 2016

(30) Foreign Application Priority Data

Nov. 7, 2013  (JP) ................................ 2013-230954

(51) Int. Cl.
| | |
|---|---|
| *C08F 20/18* | (2006.01) |
| *C08F 2/22* | (2006.01) |
| *C09D 5/02* | (2006.01) |
| *C09D 151/08* | (2006.01) |
| *C09D 133/10* | (2006.01) |

(52) U.S. Cl.
CPC ............... *C08F 20/18* (2013.01); *C08F 2/22* (2013.01); *C09D 5/02* (2013.01); *C09D 5/024* (2013.01); *C09D 133/10* (2013.01); *C09D 151/08* (2013.01)

(58) Field of Classification Search
None
See application file for complete search history.

(56) References Cited

U.S. PATENT DOCUMENTS

2011/0224352 A1  9/2011  Nakao et al.

FOREIGN PATENT DOCUMENTS

| CN | 102224207 A | 10/2011 |
|---|---|---|
| JP | 9-59560 A | 3/1997 |
| JP | 2000-212500 A | 8/2000 |
| JP | 2000-219844 A | 8/2000 |
| JP | 2000-351886 A | 12/2000 |
| JP | 2001-115080 A | 4/2001 |
| JP | 2003-226793 A | 8/2003 |
| JP | 2005-272727 A | 10/2005 |
| JP | 2008-142691 A | 6/2008 |
| JP | 2009-191228 A | 8/2009 |
| JP | 2009279566 A  * | 12/2009 |
| JP | 2011-68759 A | 4/2011 |
| JP | 2011-246639 A | 12/2011 |
| JP | 2012-92316 A | 5/2012 |
| WO | 2008/102816 A1 | 8/2008 |
| WO | 2012/043580 A1 | 4/2012 |

OTHER PUBLICATIONS

Machine translation of JP 2009-279566. (Year: 2009).*
"Adeka Reasoap ER/SR Series Technical Information." (Year: 2010).*
International Search Report dated Feb. 10, 2015, issued in counterpart of International Application No. PCT/JP2014/079400 (2 pages).
Office Action dated Mar. 20, 2018, issued in counterpart Japanese Application No. 2014-225671, with English machine translation. (6 pages).
Office Action dated Mar. 20, 2018, issued in counterpart Japanese Application No. 2014-225686, with English machine translation. (8 pages).

* cited by examiner

*Primary Examiner* — Catherine S Branch
(74) *Attorney, Agent, or Firm* — Westerman, Hattori, Daniels & Adrian, LLP

(57) ABSTRACT

A film-forming auxiliary suitable for use in a resin emulsion such as a fluororesin emulsion used as a raw material for a coating material or the like, the film-forming auxiliary containing emulsion particle, a polymer constituting the emulsion particle being obtained by emulsion polymerization of a monomer component in which the content ratio of a (meth)acrylate having a ring structure is 20-70% by mass, and the film-forming auxiliary being excellent in each of low-temperature film-forming property, warm water resistance, extensibility, weather resistance, vertical-surface coating property and warm water freezing stability.

20 Claims, No Drawings

FILM-FORMING AUXILIARY

TECHNICAL FIELD

The present invention relates to a film-forming auxiliary. More specifically, the present invention relates to a film-forming auxiliary which can be suitably used for, for example, a fluororesin emulsion which is used as a raw material of a coating material and the like.

BACKGROUND ART

In order to produce an aqueous coating composition having satisfactory adhesiveness and compatibility with a fluorine-based resin, it has been proposed to use an emulsion formed from a copolymer obtained from tertiary butyl (meth)acrylate an ethylenically unsaturated carboxylic acid monomer and other ethylenic monomer (see, for example, claim 1 and paragraph [0001] of Patent Document 1).

It is reported that when the above-mentioned emulsion is mixed with a fluororesin-based emulsion, the above-mentioned emulsion and the fluororesin-based emulsion have satisfactory compatibility with each other, and a mixture obtained by mixing both emulsions has satisfactory adhesiveness to a mortar board and a slate board (see, for example, paragraphs [0035] to [0046] of Patent. Document 1).

However, the above-mentioned emulsion has a defect such that the emulsion is poor in film-forming property at low temperatures, extensibility and warm water freezing stability (see, for example, comparative example 1 of the present specification).

Accordingly, in recent years, it has been desired to develop a film-forming auxiliary which is comprehensively excellent in film-forming property at low temperatures (low-temperature film-forming property), warm water resistance, extensibility, weather resistance, coating property on a vertical surface (vertical-surface coating property) and warm water freezing stability.

PRIOR ART DOCUMENTS

Patent Document(s)

Patent Document 1: Japanese Unexamined Patent Publication No. 2000-219844

SUMMARY OF THE INVENTION

Problem to be Solved by the Invention

The present invention has been achieved in view of the above-mentioned prior art. An object of the invention is to provide a film-forming auxiliary which is comprehensively excellent in low-temperature film-forming property, warm water resistance, extensibility, weather resistance, vertical-surface coating property and warm water freezing stability.

Means for Solving Problems

The present invention relates to a film-forming auxiliary containing emulsion particle, in which a polymer which forms the emulsion particle is Obtained by emulsion polymerization of a monomer component, and a content of a (meth)acrylate having an alicyclic structure in the monomer component is 20 to 70% by mass.

Incidentally, in the present invention, the term "(meth)acrylate" means "acrylate" or "methacrylate". The "acrylate" and the "methacrylate" can be used alone respectively, or can be used in combination.

Effect of the Invention

According to the present invention, there can be provided a film-forming auxiliary which is comprehensively excellent in low-temperature film forming property, warm water resistance, extensibility, weather resistance, vertical-surface coating property and warm water freezing stability.

Modes for Carrying Out the Invention

As described above, the film-forming auxiliary of the present invention is a film-forming auxiliary which contains an emulsion particle, in which a polymer which forms the emulsion particle is obtained by emulsion polymerization of a monomer component, and a content of a (meth)acrylate having an alicyclic structure in the monomer component is 20 to 70% by mass.

The polymer which forms the emulsion particle can be obtained by, for example, emulsion polymerization of a monomer component containing a (meth)acrylate having an alicyclic structure in a content of 20 to 70% by mass.

The monomer component containing a (meth)acrylate having an alicyclic structure in a content of 20 to 70% by mass means a monomer component in which the content of the (meth)acrylate in all of the monomers used as a raw material of the polymer which forms the emulsion particle is 20 to 70% by mass in any case of an emulsion particle having a single layer structure and an emulsion particle having a multilayer structure.

In the present invention, one of major characteristics resides in that the content of a (meth)acrylate having an alicyclic structure in the monomer component is 20 to 70% by mass as described above. Since the content of the (meth)acrylate having an alicyclic structure in the monomer component used as a raw material of the polymer which forms the emulsion particle used in the present invention is 20 to 70% by mass, the film-forming auxiliary of the present invention is comprehensively excellent in low-temperature film-forming property, warm water resistance, extensibility, weather resistance, vertical-surface coating property and warm water freezing stability.

The (meth)acrylate having an alicyclic structure includes, for example, cyclohexyl (meth)acrylate, isobornyl (meth)acrylate and the like. These (meth)acrylates having an alicyclic structure can be used alone respectively, or can be used in combination. Among these (meth)acrylates having an alicyclic structure, from the viewpoint of obtaining a film-forming auxiliary which is comprehensively excellent, in low-temperature film-forming property, warm water resistance, extensibility, weather resistance, vertical-surface coating property and warm water freezing stability, cyclohexyl (meth)acrylate is preferred, and cyclohexyl methacrylate is more preferred.

The content of the (meth)acrylate having an alicyclic structure in the above-mentioned monomer component is 20% by mass or more, preferably 25% by mass or more, and furthermore preferably 30% by mass or more, from the viewpoint of improvement in warm water resistance and weather resistance, and the content is preferably 70% by mass or less, more preferably 65% by mass or less, and furthermore preferably 60% by mass or less, from the viewpoint of improvement in low-temperature film-forming property and extensibility.

The above-mentioned monomer component includes, for example, a monomer other than the (meth)acrylate having an alicyclic structure (hereinafter, referred to as other monomer). The content of the other monomer in the above-mentioned monomer component is preferably 30% by mass or more, more preferably 35% by mass or more, and furthermore preferably 40% by mass or more, from the viewpoint of improvement, in low-temperature film-forming property and extensibility, and the content is 80% by mass or less, preferably 75% by mass or less, and more preferably 70% by mass or less, from the viewpoint of improvement in warm water resistance and weather resistance.

The other monomer includes, for example, an alkyl (meth)acrylate, a hydroxyl group-containing (methacrylate, a carboxyl group-containing monomer, an oxo group-containing monomer, a fluorine atom-containing monomer, a nitrogen-containing monomer, an epoxy group-containing monomer, an aromatic monomer and the like, and the present invention is not limited only to those exemplified ones. These monomers can be used alone respectively, or two or more kinds thereof can be used in combination.

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, n-octyl (methacrylate, n-lauryl (meth)acrylate and 2-(acetoacetoxy)ethyl (meth)acrylate, and the like, and the present invention is not limited only to those exemplified ones. These monomers can be used alone respectively, or two or more kinds thereof can be used in combination.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers can be used alone respectively, or two or more kinds thereof can be used in combination.

The carboxyl group-containing monomer includes, for example, carboxyl group-containing aliphatic monomers such as (meth)acrylic acid, maleic acid, fumaric acid, crotonic acid, itaconic acid and maleic anhydride, and the like, and the present invention is not limited only to those exemplified ones. These monomers can be used alone respectively, or two or more kinds thereof can be used in combination. Among these carboxyl group-containing monomers, from the viewpoint of improvement in dispersion stability of the emulsion particle, acrylic acid, methacrylic acid and itaconic acid are preferred, and acrylic acid and methacrylic acid are more preferred.

Incidentally, in the present invention, "(meth)acrylic acid" means "acrylic acid" or "methacrylic acid". The "acrylic acid" and the "methacrylic acid" can be used alone respectively, or can be used in combination.

The oxo group-containing monomer includes, for example, (di)ethylene glycol (methoxy)(meth)acrylates such as ethylene glycol (meth)acrylate, ethylene glycol methoxy (meth)acrylate, diethylene glycol (meth)acrylate and diethylene glycol methoxy(meth)acrylate, and the like, and the present invention is not limited only to those exemplified ones. These monomers can be used alone respectively, or two or more kinds thereof can be used in combination.

The fluorine atom-containing monomer includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers can be used alone respectively, or two or more kinds thereof can be used in combination.

The nitrogen atom-containing monomer includes, for example, acrylamide compounds such as (meth)acrylamide. N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers can be used alone respectively, or two or more kinds thereof can be used in combination.

Incidentally, in the present invention. "(meth)acrylamide" means "acrylamide" or "methacrylamide". The "acrylamide" and the "methacrylamide" can used alone respectively, or can be used in combination.

The epoxy group-containing monomer includes, for example, epoxy group-containing (meth)acrylates such as glycidyl (meth)acrylate, and the present invention is not limited only to those exemplified ones. These monomers can be used alone respectively, or two or more kinds thereof can be used in combination.

The aromatic monomer includes, for example, styrene, α-methylstyrene, p-methylstyrene, tert-methylstyrene, chlorostyrene, an aralkyl (meth)acrylate, vinyltoluene and the like, and the present invention is not limited only to those exemplified ones. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. These aromatic monomers can be used alone respectively, or two or more kinds thereof can be used in combination. Among these aromatic monomers, styrene is preferred from the viewpoint of improvement in water permeation resistance of a coating film.

Among the above-mentioned other monomers, from the viewpoint of Obtaining a film-forming auxiliary which is comprehensively excellent in low-temperature film-forming property, warm water resistance, extensibility, weather resistance, vertical-surface coating property and warm water freezing stability, an alkyl (meth)acrylate having an alkyl group of 4 or more carbon atoms, which forms a homopolymer having a glass transition temperature of −50° C. or lower (hereinafter, referred to as specific monomer), is preferred. Among the above-mentioned specific monomers, 2'-ethylhexyl acrylate is more preferred from the viewpoint of obtaining a film-forming auxiliary which is comprehensively excellent in low-temperature film-forming property, warm water resistance, extensibility, weather resistance vertical-surface coating property and warm Water freezing stability.

The content of the specific monomer in the monomer component is preferably 5% by mass or more, more preferably 10% by mass or more, and furthermore preferably 15% by mass or more, from the viewpoint of obtaining a film-forming auxiliary which is comprehensively excellent in low-temperature film-forming property, warm water resistance, extensibility, weather resistance, vertical-surface coating property and warm Water freezing stability, and the content of the specific monomer in the monomer component is preferably 60% by mass or less, more preferably 55% by mass Or less, and furthermore preferably 50% by mass or less, from the viewpoint of Obtaining a film-forming auxiliary which is comprehensively excellent in warm water resistance, extensibility, weather resistance, vertical-surface coating property and warm water freezing stability.

In the present invention, it is preferable to use the (meth) acrylate having an alicyclic structure and the specific monomer in combination. When the (meth)acrylate having an alicyclic structure and the specific monomer are used in combination, a film-forming auxiliary which is comprehensively excellent in warm water resistance, extensibility, weather resistance, vertical-surface coating property and warm water freezing stability can be obtained.

When the (meth)acrylate having an alicyclic structure and the specific monomer are used in combination, a mass ratio of the (meth)acrylate having an alicyclic structure to the specific monomer [(meth)acrylate having an alicyclic structure/specific monomer] is preferably 20/80 or higher, more preferably 25/75 or higher, and furthermore preferably 30/70 or higher, from the viewpoint of obtaining a film-forming auxiliary which is comprehensively excellent in warm water resistance, extensibility, weather resistance, vertical-surface coating property and warm water freezing stability, and the mass ratio is preferably 95/5 or less, and more preferably 90/10 or less, from the viewpoint, of obtaining a film-forming auxiliary which is comprehensively excellent in warm water resistance, extensibility, weather resistance, vertical-surface coating property and warm water freezing stability.

The total content of the (meth)acrylate having an alicyclic structure and the specific monomer in the monomer component is preferably 30 to 100% by mass, more preferably 35 to 100% by mass, and furthermore preferably 40 to 100% by mass, from the viewpoint of obtaining a film-forming auxiliary which is comprehensively excellent in warm water resistance, extensibility, weather resistance, vertical-surface coating property and warm water freezing stability A method for emulsion polymerizing the monomer component includes, for example, a method of dissolving an emulsifier in a medium such as water or an aqueous medium containing a water-soluble organic solvent such as a lower alcohol such as methanol or ethanol and water, and adding a monomer component and a polymerization initiator dropwise to the solution under stirring, a method of adding dropwise a monomer component which has been previously emulsified by using an emulsifier and water to water or an aqueous medium, and the like, and the present invention is not limited only to those methods. Incidentally, the amount of the medium can be appropriately adjusted in consideration of the amount of a non-volatile component included in an obtained resin emulsion.

The emulsifier includes, for example, an anionic emulsifier, a nononic emulsifier, a cationic emulsifier, an amphoteric emulsifier and a polymeric emulsifier, and these emulsifiers can be used alone respectively, or two Or more kinds thereof can used in combination.

The anionic emulsifier includes, for example, alkyl sulfate salts such as ammonium dodecyl sulfate and sodium dodecyl sulfate alkyl sulfonate salts such as ammonium dodecyl sulfonate and sodium dodecyl sulfonate; alkyl arylsulfonate salts such as ammonium dodecyl benzenesulfonate and sodium dodecyl naphthalenesulfonate; polyoxyethylene alkyl sulfate salts; polyoxyethylene alkyl aryl sulfate salts; dialkyl sulfosuccinate salts; arylsulfonic acid-formaldehyde condensates; and fatty acid salts such as ammonium laurylate and sodium stearylate; and the like, and the present invention is not limited only to those exemplified ones.

The nonionic emulsifier includes, for example, a polyoxyethylene alkyl ether, a polyoxyethylene alkyl aryl ether, a condensate of polyethylene glycol and polypropylene glycol, a sorbitan fatty acid ester, a polyoxyethylene sorbitan fatty acid ester, a fatty acid monoglyceride, a condensation product of ethylene oxide and an aliphatic amine, and the like, and the present invention is not limited only to those exemplified ones.

The cationic emulsifier includes, for example, an alkylammonium salt such as dodecylammonium chloride, and the like, and the present invention is not limited only to those exemplified ones.

The amphoteric emulsifier includes, for example, a betaine ester type emulsifier and the like, and the present invention is not limited only to those exemplified ones.

The polymeric emulsifier includes, for example, a poly(meth)acrylic acid salt such as sodium polyacrylate; polyvinyl alcohol; polyvinylpyrrolidone; a polyhydroxyalkyl (meth)acrylate such as polyhydroxyethyl acrylate; a copolymer of which copolymerizing component is one or more monomers which constitute these polymers, and the present invention is not limited only to those exemplified ones.

Furthermore, the emulsifier is preferably an emulsifier having a polymerizable group, that is, a so-called reactive emulsifier from the viewpoint of improvement in water permeation resistance of a coating film, and the emulsifier is preferably a non-nonylphenyl type emulsifier from the viewpoint of environmental protection.

The reactive emulsifier includes, for example, a propenyl alkyl sulfosuccinic acid ester salt, a (meth)acrylic acid polyoxyethylene sulfonate salt, a (meth)acrylic acid polyoxyethylene phosphate salt [for example, trade name ELEMINOL RS-30 manufactured by Sanyo Chemical Industries, Ltd., and the like], a polyoxyethylene alkyl propenyl phenyl ether sulfonate salt [for example, trade name of AQUALON HS-10 manufactured by DKS Co., Ltd., and the like], a sulfonate salt of an allyloxymethyl alkyloxy polyoxyethylene [for example, trade name of AQUALON KH-10 manufactured by DKS Co., Ltd., and the like], a sulfonate salt of an allyloxymethyl nonylphenoxyethyl hydroxypolyoxyethylene [for example, trade name of ADEKA REASOAP SE-10 manufactured by ADEKA CORPORATION, and the like], an allyloxymethyl alkoxyethyl hydroxypolyoxyethylene sulfuric acid ester salt [for example, trade name of ADEKA REASOAP SR-10 and SR-30 manufactured by ADEKA CORPORATION, and the like], a bis(polyoxyethylene polycyclic phenyl ether) methacrylated sulfonate salt [for example, trade name of ANTOX MS-60 manufactured by Nippon Nyukazai Co., Ltd., and the like], allyloxymethyl alkoxyethyl hydroxypolyoxyethylene [for example, trade name of ADEKA REASOAP ER-20 manufactured by ADEKA CORPORATION, and the like], a polyoxyethylene alkylpropenyl phenyl ether [for example, trade name of AQUALON RN-20 manufactured by DKS Co., Ltd., and the like], allyloxymethyl nonylphenoxyethyl hydroxypolyoxyethylene [for example, trade name of ADEKA REASOAP NE-10 manufactured by ADEKA CORPORATION, and the like], and the like, and the present invention is not limited only to those exemplified ones.

The amount of the emulsifier per 100 parts by mass of the monomer component is preferably 0.5 parts by mass or more, more preferably 1 part by mass or more, furthermore preferably 2 parts by mass or more, and still more preferably 3 parts by mass or more, from the viewpoint of improvement in polymerization stability, and the amount of the emulsifier is preferably 10 parts by mass or less, more preferably 7 parts by mass or less, furthermore preferably 6 parts by mass or less, still more preferably 5 parts by mass or less, and furthermore preferably 4 parts by mass or less, from the viewpoint of improvement in water permeation resistance of a coating film.

The polymerization initiator includes, for example, azo compounds such as azobisisobutyronitrile, 2,2-azobis(2-methylbutyronitrile), 2,2-azobis(2,4-dimethylvaleronitrile), 2,2-azobis(2-diaminopropane) hydrochloride, 4,4-azobis(4-cyanovaleric acid) and 2,2-azobis(2-methylpropionamidine); persulfuric acid salts such as potassium persulfate; peroxides such as hydrogen peroxide, benzoyl peroxide, para-chlorobenzoyl peroxide, lauroyl peroxide and ammonium peroxide; and the like, and the present invention is not limited only to those exemplified ones. These polymerization initiators can be used alone respectively, or two or more kinds thereof can be used in combination.

The amount of the polymerization initiator per 100 parts by mass of the monomer component is preferably 0.05 parts by mass or more, and more preferably 0.1 parts by mass or more, from the viewpoint of increase in polymerization rate and reduction of a residual amount of an unreacted monomer component. The amount of the polymerization initiator is preferably 1 part by mass or less, and more preferably 0.5 parts by mass or less, from the viewpoint of improvement in water permeation resistance of a coating film.

A method for adding a polymerization initiator is not particularly limited. The method for adding a polymerization initiator includes, for example, batch feeding, divided feeding, continuous dropping and the like. Furthermore, from the viewpoint of acceleration of the end point of the polymerization reaction, a part of the polymerization initiator can be added before the completion of the addition of the monomer component to the reaction system, or after the completion of the addition of the monomer component.

Incidentally, in order to accelerate the decomposition of the polymerization initiator, for example, a reducing agent such as sodium hydrogen sulfite, or a decomposition agent for a polymerization initiator such as a transition metal salt such as ferrous sulfate can be added in an appropriate amount to the reaction system.

Furthermore, for example, additives such as a chain transfer agent such as a compound having a thiol group, such as tert-dodecylmercaptan, a pH buffering agent and a chelating agent can be added to the reaction system as occasion demands. The amount of the additives cannot be absolutely determined since the amount differs depending on the kind of the additives. The amount of the additives per 100 parts by mass of the monomer component is preferably 0.01 to 5 parts by mass, and more preferably 0.1 to 3 parts by mass.

The atmosphere where emulsion polymerization of the monomer component is carried out is not particularly limited, and the atmosphere is preferably an inert gas such as nitrogen gas from the viewpoint of increase in efficiency of the polymerization initiator.

When emulsion polymerization of the monomer component is carried out, the polymerization temperature is not particularly limited. The polymerization temperature is usually preferably 50 to 100° C., and more preferably 60 to 95° C. The polymerization temperature can be constant, or can be changed in the course of the polymerization reaction.

The polymerization period of time for emulsion polymerizing the monomer component is not particularly limited, and can be appropriately adjusted in accordance with the progress of the polymerization reaction. The polymerization period of time is usually 2 to 9 hours or so.

When the monomer component is emulsion polymerized as described above, a polymer is obtained in the form of an emulsion particle.

The above-mentioned polymer may have a crosslinked structure. The weight average molecular weight of the polymer is preferably 100,000 or more, more preferably 300,000 or more, furthermore preferably 550,000 or more, and still more preferably 600,000 or more, from the viewpoint of improvement in water permeation resistance of a coating film in any case of a polymer having a crosslinked structure and a polymer not having a crosslinked structure. When the polymer has a crosslinked structure, the upper limit of the weight average molecular weight of the polymer is not particularly limited because determination of the weight average molecular weight of the crosslinked polymer is difficult. When the polymer does not have a crosslinked structure, the weight average molecular weight of the polymer is preferably 5,000,000 or less from the viewpoint of improvement in film-forming property.

Incidentally, in the present specification, the weight average molecular weight means a weight average molecular weight (calculated relative to polystyrene standards) as determined by using a gel permeation chromatography [product No.: HLC-8120GPC and columns: TSKgel G-5000HXL and TSKgel GMHXL-L in series, which are manufactured by Tosoh Corporation].

The glass transition temperature of the whole of the polymers used in the emulsion particle is preferably −10° C. or higher, more preferably −5° C. or higher, and furthermore preferably 0° C. or higher, from the viewpoint of improvement in warm water resistance and weather resistance, and the glass transition temperature of the whole of the polymer is preferably 60° C. or lower, more preferably 55° C. or lower, and furthermore preferably 50° C. or lower, from the viewpoint of improvement in low-temperature film-forming property, extensibility and warm water freezing stability.

The glass transition temperature of the polymer can be easily regulated by adjusting the composition of the monomers used in the monomer component.

Incidentally, in the present specification, the glass transition temperature of the polymer means a temperature as determined by using a glass transition temperature of a homopolymer of the monomer used in the monomer component which constitute the polymer, based on the Fox's equation represented by the equation:

$$1/Tg = \Sigma(Wm/Tgm)/100$$

wherein Wm represents a content (% by mass) of a monomer m in the monomer component which constitutes a polymer; and Tgm represents a glass transition temperature (absolute temperature: K) of a homopolymer of the monomer m.

The glass transition temperature of a polymer is, for example, 107° C. for a homopolymer of tert-butyl methacrylate, 180° C. for a homopolymer of isobornyl methacrylate, 83° C. for a homopolymer of cyclohexyl methacrylate, 130° C. for a homopolymer of 1,2,2,6,6-pentamethylpiperidyl methacrylate, 130° C. for a homopolymer of 2,2,6,6-tetramethylpiperidyl methacrylate, −70° C. for a homopolymer of 2-ethylhexyl acrylate, 95° C. for a homopolymer of acrylic acid, 105° C. for a homopolymer of methyl methacrylate, −56° C. for a homopolymer of n-butyl acrylate, 130° C. for a homopolymer of methacrylic acid, 70° C. for a homopolymer of γ-methacryloyloxypropyltrimethoxysilane, 20° C. for a homopolymer of n-butyl methacrylate, and 100° C. for a homopolymer of styrene.

The glass transition temperature of a polymer is a value as determined based on the Fox's equation, and it is preferred that the measured value of the glass transition temperature of a polymer is the same as the value as determined based on the Fox's equation.

Incidentally, as to a monomer where a glass transition temperature of a homopolymer made of the monomer is unknown, such as a special monomer or a polyfunctional monomer, when the total content of the monomer where the glass transition temperature of a homopolymer made of the monomer is unknown in the monomer component is 10% by mass or less, the glass transition temperature is determined by using only the monomers of which glass transition temperatures have been found. Furthermore, when the total content of the monomer where the glass transition temperature of a homopolymer made of the monomer is unknown in the monomer component exceeds 10% by mass, the glass transition temperature of a polymer obtained by polymerizing the monomer component can be determined by, for example, measuring differential scanning calories of the polymer.

As an analyzer for measuring the differential scanning calories, there can be used, for example, an analyzer manufactured by Seiko Instruments, Inc. under the product number of DSC220C, and the like. Also, there are no particular limitations in a method for drawing a differential scanning calorimetric (DSC) curve when the differential scanning calories are measured, a method for obtaining a first differential curve from the differential scanning calorimetric (DSC) curve, a method for performing a smoothing treatment, a method for determining a target peak temperature, and the like. For example, when the above-mentioned analyzer is used, a curve can be produced from the data obtained by using the analyzer. At that time, an analytic software program which can perform mathematical processing can be used. The analytic software program includes, for example, analytic software [manufactured by Seiko Instruments, Inc. under the product number of EXSTAR6000], and the present invention is not limited only to those exemplified ones. Incidentally, the peak temperature as determined by the above method may include an error of ±5° C. or so which is caused by drawing.

When the emulsion polymerization of the monomer component is carried out as mentioned above, a polymer can be obtained in the form of emulsion particle.

Incidentally, an emulsion particle may have an inner layer and an outer layer. An emulsion particle having an inner layer and an outer layer can be obtained by carrying out emulsion polymerization of a monomer component which forms the outer layer in the presence of the emulsion particle obtained by carrying out the emulsion polymerization of a monomer component which forms the inner layer.

The polymer which forms the inner layer can be obtained by, for example, emulsion polymerizing a monomer component which is used as raw material for a polymer which forms the inner layer.

The monomer which is used in a monomer component which is used as a raw material of a polymer which forms the inner layer includes, for example, an ethylenically unsaturated monomer, an aromatic monomer and the like. These monomers can be used alone respectively or in combination.

The ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These monomers can be used alone respectively, or two or more kinds thereof can be used in combination.

In the present invention, the alkyl group of the alkyl (meth)acrylate has a concept which includes, a linear alkyl group, an alkyl group having a branched chain and an alkyl group having a cyclic structure (for example, an alicyclic structure and the like).

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, isobornyl (meth)acrylate, n-octyl (meth)acrylate, n-lauryl (meth)acrylate and 2-(acetoacetoxy)ethyl (meth)acrylate and the like, and the present invention is not limited only to those exemplified ones. These monomers can be used alone respectively, or two or more kinds thereof can be used in combination.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers can be used alone respectively, or two or more kinds thereof can be used in combination.

The carboxyl group-containing monomer includes, for example, carboxyl group-containing aliphatic monomers such as (meth)acrylic acid, maleic acid, fumaric acid, crotonic acid, itaconic acid and maleic anhydride, and the like, and the present invention is not limited only to those exemplified ones. These monomers can be used alone respectively, or two or more kinds thereof can be used in combination. Among these carboxyl group-containing monomers, from the viewpoint of improvement in dispersion stability of emulsion particles, acrylic acid, methacrylic acid and itaconic acid are preferred, and acrylic acid and methacrylic acid are more preferred.

The oxo group-containing monomer includes, for example, (di)ethylene glycol (methoxy)(meth)acrylates such as ethylene glycol (meth)acrylate, ethylene glycol methoxy (meth)acrylate, diethylene glycol (meth)acrylate and diethylene glycol methoxy(meth)acrylate, and the like, and the present invention is not limited only to those exemplified ones. These monomers can be used alone respectively, or two or more kinds thereof can be used in combination.

The fluorine atom-containing monomer includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers can be used alone respectively, or two or more kinds thereof can be used in combination.

The nitrogen atom-containing monomer includes, for example, acrylamide compounds such as (meth)acrylamide, N,N-dimethylaminopropyl acrylamide and diacetone acrylamide; nitrogen atom-containing (meth)acrylate compounds such as dimethylaminoethyl (meth)acrylate and diethylaminoethyl (meth)acrylate; N-vinylpyrrolidone; and the like, and the present invention is not limited only to those exemplified ones. These monomers can be used alone respectively, or two or more kinds thereof can be used in combination.

Incidentally, in the present invention, "(meth)acrylamide" means "acrylamide" or "methacrylamide". The "acrylamide" and the "methacrylamide" can be used alone respectively or in combination.

The epoxy group-containing monomer includes, for example, epoxy group-containing (meth)acrylates such as glycidyl (meth)acrylate, and the like, and the present invention is not limited only to those exemplified ones. These monomers can be used alone respectively, or two or more kinds thereof can be used in combination.

The aromatic monomer includes, for example, styrene, α-methylstyrene, p-methylstyrene, tert-methylstyrene, chlorostyrene, an aralkyl (meth)acrylate, vinyltoluene and the like, and the present invention is not limited only to those exemplified ones. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. These aromatic monomers can be used alone respectively, or two or more kinds thereof can be used in combination. Among these aromatic monomers, styrene is preferred from the viewpoint of improvement in water permeation resistance of a coating film.

The monomer component which is used as a raw material of the inner layer is preferably the ethylenically unsaturated monomer, and more preferably the alkyl (meth)acrylate, from the viewpoint of improvement in warm water resistance and weather resistance.

In addition, it is preferred that the monomer component which is used as a raw material of the inner layer includes, the alkyl (meth)acrylate and other monomer component which is capable of copolymerizing with the alkyl (meth) acrylate, from the viewpoint of obtaining a film-forming auxiliary which is comprehensively excellent in warm-water film-forming property, warm water resistance, extensibility, weather resistance, vertical-surface coating property and warm water freezing stability. Among the other monomer component which is capable of copolymerizing with the alkyl (meth)acrylate, from the viewpoint of obtaining a film-forming auxiliary which is comprehensively excellent in low-temperature film-forming property, warm water resistance, extensibility, weather resistance, vertical-surface coating property and warm water freezing stability, the hydroxyl group-containing (meth)acrylate, the carboxyl group-containing monomer, the oxo group-containing monomer, the fluorine atom-containing monomer, the nitrogen atom-containing monomer and the epoxy group-containing monomer are preferred, the carboxyl group-containing monomer is more preferred, and acrylic acid and methacrylic acid are furthermore preferred. The content of the alkyl (meth)acrylate in the monomer component is preferably 60% by mass or more, more preferably 70% by mass or more, and furthermore preferably 80% by mass or more, from the viewpoint of obtaining a film-forming auxiliary which is comprehensively excellent in low-temperature film-forming property, warm water resistance, extensibility, weather resistance, vertical-surface coating property and warm-water freezing stability, and the content of the other monomer component which is capable of copolymerizing with the alkyl (meth)acrylate is preferably 40% by mass or less, more preferably 30% by mass or less, and furthermore preferably 20% by mass or less. Incidentally, the upper limit of the content of the alkyl (meth)acrylate in the monomer component is 100% by mass.

In addition, among the monomer component which is used as a raw material of the inner layer, from the viewpoint of obtaining a film-forming auxiliary which is comprehensively excellent in warm-water film-forming property, warm water resistance, extensibility, weather resistance, vertical-surface coating property and warm-water freezing stability, the alkyl (meth)acrylate having an alkyl group of 4 to 12 carbon atoms is preferred, the alkyl (meth)acrylate having an alkyl group of 4 to 8 carbon atoms is more preferred, and tert-butyl (meth)acrylate, 2-ethylhexyl (meth)acrylate, cyclohexyl (meth)acrylate and isobornyl (meth)acrylate are furthermore preferred. The content of the alkyl (meth) acrylate in the above-mentioned monomer component is preferably 20 to 100% by mass, and more preferably 25 to 100% by mass. The suitable monomer other than the alkyl (meth)acrylate, which is used in the monomer component includes, for example, an alkyl (meth)acrylate having 1 to 3 carbon atoms, (meth)acrylic acid and the like. Among the alkyl (meth)acrylates having an alkyl group of 1 to 3 carbon atoms, methyl (meth)acrylate is preferred. The content of the monomer other than the alkyl (meth)acrylate in the monomer component is preferably 0 to 80% by mass, and more preferably 0 to 75% by mass, from the viewpoint of obtaining a film-forming auxiliary which is comprehensively excellent in low-temperature film-forming property, warm water resistance, extensibility, weather resistance, vertical-surface coating property and warm water freezing stability.

A method for emulsion polymerizing a monomer component which is used as a raw material of the inner layer can be the same as the method for emulsion polymerizing the above-mentioned monomer component.

As described above, by emulsion polymerizing the monomer component which forms the inner layer, a polymer which forms the inner layer can be obtained in the form of emulsion particle.

The above-mentioned polymer may have a crosslinked structure. The weight average molecular weight of the polymer is preferably 100,000 or more, more preferably 300,000 or more, furthermore preferably 550,000 or more and still furthermore preferably 600,000 or more, from the viewpoint of improvement in water permeation resistance of a coating film in any case of a polymer having a crosslinked structure and a polymer not having a crosslinked structure. When the polymer has a crosslinked structure, the upper limit of the weight average molecular weight of the polymer is not particularly limited because it is difficult to determine the weight average molecular weight of the crosslinked polymer. When the polymer does not have a crosslinked structure, the upper limit of the weight average molecular weight of the polymer is preferably 5,000,000 or less from the viewpoint of improvement in film-forming property.

The glass transition temperature of the polymer which forms the inner layer is preferably 60° C. or higher, more preferably 65° C. or higher, and furthermore preferably 70° C. or higher, from the viewpoint of improvement in warm water resistance, weather resistance and warm-water freezing stability, and preferably 180° C. or lower, more preferably 160° C. or lower, and furthermore preferably 140° C. or lower, from the viewpoint of improvement in low-temperature film-forming property.

The glass transition temperature of the polymer which forms the inner layer can be easily controlled by adjusting the kind and amount of the monomers used in the monomer component.

After the inner layer is formed from the above-mentioned polymer, an outer layer is formed. The polymer which forms the outer layer can be obtained by, for example, emulsion polymerizing a monomer component which is used as a raw material of the polymer which forms the outer layer.

It is preferred that an alkyl (meth)acrylate having an alkyl group of 4 or more carbon atoms, which forms a homopolymer having a glass transition temperature of 60° C. or higher, is contained in the monomer component which is used as a raw material of the polymer which forms the outer layer in a content of 20 to 95% by mass from the viewpoint of obtaining a film-forming auxiliary which is comprehensively excellent in low-temperature film-forming property, warm water resistance, extensibility, weather resistance, vertical-surface coating property and warm water freezing stability.

Among the alkyl (meth)acrylate having an alkyl group of 4 or more carbon atoms, which forms a homopolymer having a glass transition temperature of 60° C. or higher, from the viewpoint of obtaining a film-forming auxiliary which is comprehensively excellent in low-temperature film-forming property, warm water resistance, extensibility, weather resistance, vertical-surface coating property and warm water freezing stability, an alkyl (meth)acrylate having an alkyl group of 4 to 12 carbon atoms, which forms a homopolymer having a glass transition temperature of 60° C. or higher is preferred, an alkyl (meth)acrylate having an alkyl group of 4 to 8 carbon atoms, which forms a homopolymer having a glass transition temperature of 60° C. or higher is more preferred, and tert-butyl methacrylate, isobornyl methacrylate, cyclohexyl methacrylate, 2,2,6,6-tetramethylpiperidyl methacrylate and 1,2,2,6,6-pentamethylpiperidyl methacrylate are furthermore preferred. It is still preferred that cyclohexyl (meth)acrylate is used as an essential component in the monomer component. The content of the alkyl (meth)acrylate having an alkyl group of 4 or more carbon atoms, which forms a homopolymer having a glass transition temperature of 60° C. or higher in the monomer component is preferably 20 to 95% by mass, more preferably 25 to 85% by mass, and furthermore preferably 30 to 70% by mass, from the viewpoint of obtaining a film-forming auxiliary which is comprehensively excellent in low-temperature film-forming property, warm water resistance, extensibility, weather resistance, vertical-surface coating property and warm-water freezing stability. In addition, from the viewpoint of obtaining a film-forming auxiliary which is comprehensively excellent in low-temperature film-forming property, warm water resistance, extensibility, weather resistance, vertical-surface coating property and warm water freezing stability, the content of the cyclohexyl (meth)acrylate in the monomer component which is a raw material of a polymer which forms the outer layer is preferably 20 to 95% by mass, more preferably 25 to 85% by mass and furthermore preferably 30 to 70% by mass.

A preferred monomer other than the alkyl (meth)acrylate having an alkyl group of 4 or more carbon atoms, which forms a homopolymer having a glass transition temperature of 60° C. or higher includes, for example, an ethylenically unsaturated monomer other than the alkyl (meth)acrylate having an alkyl group of 4 or more carbon atoms, which forms a homopolymer having a glass transition temperature of 60° C. or higher, an aromatic monomer such as styrene, and the like. These monomers can be used alone respectively or in combination. As the ethylenically unsaturated monomer and the aromatic monomer, there can be exemplified, for example, the ethylenically unsaturated monomer and the aromatic monomer which are used in the monomer component which is used as a raw material of the polymer which forms the inner layer. More specifically, as the ethylenically unsaturated monomer, there can be exemplified, for example, an alkyl (meth)acrylate having an alkyl group of 1 to 3 carbon atoms, an alkyl (meth)acrylate having an alkyl group of 4 or more carbon atoms other than the alkyl (meth)acrylate having an alkyl group of 4 or more carbon atoms, which forms a homopolymer having a glass transition temperature of 60° C. or higher, a hydroxyl group-containing (meth)acrylate, a carboxyl group-containing monomer, an oxo group-containing monomer, a fluorine atom-containing monomer, a nitrogen atom-containing monomer, an epoxy group-containing monomer, an aromatic monomer, and the like. These monomers can be used alone respectively, or two or more kinds thereof can be used in combination. Among the monomers other than the alkyl (meth)acrylate having an alkyl group of 4 or more carbon atoms, which forms a homopolymer having a glass transition temperature of 60° C. or higher, from the viewpoint of obtaining a film-forming auxiliary which is comprehensively excellent in low-temperature film-forming property, warm water resistance, extensibility, weather resistance, vertical-surface coating property and warm water freezing stability, methyl (meth)acrylate, (meth)acrylic acid and styrene are preferred. The content of the monomer other than the alkyl (meth)acrylate having an alkyl group of 4 or more carbon atoms, which forms a homopolymer having a glass transition temperature of 60° C. or higher in the monomer component is preferably 5 to 80% by mass, more preferably 15 to 75% by mass, and furthermore preferably 30 to 70% by mass, from the viewpoint of obtaining a film-forming auxiliary which is comprehensively excellent in low-temperature film-forming property, warm water resistance, extensibility, weather resistance, vertical-surface coating property and warm water freezing stability A method for emulsion polymerizing the monomer component which is used as a raw material of the outer layer includes, for example, a method of adding dropwise the monomer component and a polymerization initiator to a resin emulsion containing the emulsion particle constituting the inner layer with stirring, a method of adding dropwise the monomer component which has been previously emulsified by using an emulsifier and water to a resin emulsion containing the emulsion particle constituting the inner layer, and the like, and the present invention is not limited only to those exemplified methods.

As the emulsifier, there can be exemplified those used in forming the above-mentioned inner layer, and only one kind of the emulsifier can be used, or two or more kind of the emulsifier can be used in combination.

In addition, the emulsifier is preferably an emulsifier having a polymerizable group, which is a so-called reactive emulsifier from the viewpoint of improvement in water permeation resistance of a coating film, and the emulsifier is preferably a non-nonylphenyl type emulsifier from the viewpoint of environmental protection. As the reactive emulsifier, there can be exemplified those used in forming the above-mentioned inner layer, and only one kind of the reactive emulsifier can be used, or two or more kinds of the reactive emulsifier can be used in combination.

The amount of the emulsifier per 100 parts by mass of the monomer component is preferably 0.5 parts by mass or more, more preferably 1 part by mass or more, furthermore preferably 2 parts by mass or more, and still furthermore preferably 3 parts by mass or more, from the viewpoint of improvement in polymerization stability, and preferably 10 parts by mass or less, more preferably 7 parts by mass or less, furthermore preferably 6 parts by mass or less, still more preferably 5 parts by mass or less, and still furthermore preferably 4 parts by mass or less, from the viewpoint of improvement in water permeation resistance of a coating film.

As the polymerization initiator, there can be exemplified those used in forming the above-mentioned inner layer, and only one kind of the polymerization initiator can be used, or two or more kinds of the polymerization initiator can be used in combination.

The amount of the polymerization initiator per 100 parts by mass of the monomer component is preferably 0.05 parts by mass or more, and more preferably 0.1 parts by mass or more, from the viewpoint of improvement in rate of polymerization and reduction of remaining amount of an unreacted monomer component, and preferably 1 part by mass or less, and more preferably 0.5 parts by mass or less from the viewpoint of improvement in water permeation resistance of a coating film.

A method for adding the polymerization initiator is not particularly limited. As the method for adding the polymerization initiator, there can be cited, for example, batch feeding, divided feeding, continuous dropping, and the like. A part of the polymerization initiator can be added to a reaction system before the completion of the addition of the monomer component or after the completion of the addition of the monomer component, from the viewpoint of acceleration of the end point of the polymerization reaction.

Incidentally, in order to accelerate decomposition of the polymerization initiator, for example, a reducing agent such as sodium hydrogen sulfite, or a decomposition agent for a polymerization initiator, such as a transition metal salt such as ferrous sulfate can be added to the reaction system in an appropriate amount.

In addition, additives such as a chain transfer agent such as a compound having a thiol group such as tert-dodecylmercaptan, a pH buffering agent and a chelating agent can be added to the reaction system as occasion demands. Since the amount of the additives varies depending on the kind of the additives, the amount of the additives cannot be absolutely determined, and the amount is usually preferably 0.01 to 5 parts by mass, and more preferably 0.1 to 3 parts by mass per 100 parts by mass of the monomer component.

The atmosphere where emulsion polymerization of the monomer component is carried out is not particularly limited, and is preferably an inert gas such as nitrogen gas from the viewpoint of increase in efficiency of the polymerization initiator.

When emulsion polymerization of the monomer component is carried out, the polymerization temperature is not particularly limited, and is preferably 50 to 100° C., and more preferably 60 to 95° C. The polymerization temperature can be constant, or can be varied in the course of the polymerization reaction.

The polymerization period of time for emulsion polymerizing the monomer component is not particularly limited, and can be appropriately controlled in accordance with the progress of the polymerization reaction. The polymerization period of time is usually 2 to 9 hours or so.

When the emulsion polymerization of the monomer component is carried out as described above, a resin emulsion containing an emulsion particle having an outer layer formed on the surface of an inner layer is obtained.

The polymer which forms the inner layer and the polymer which forms the outer layer can have a crosslinked structure, respectively. The weight average molecular weight of the polymer is preferably 100,000 or more, more preferably 300,000 or more, furthermore preferably 550,000 or more, and still furthermore preferably 600,000 or more, from the viewpoint of improvement in water permeation resistance of a coating film in any case of a polymer having a crosslinked structure and a polymer not having a crosslinked structure. When the polymer has a crosslinked structure, the upper limit of the weight average molecular weight of the polymer is not particularly limited because it is difficult to determine the weight average molecular weight of the crosslinked polymer. When the polymer does not have a crosslinked structure, the upper limit of the weight average molecular weight of the polymer is preferably 5,000,000 or less from the viewpoint of improvement in film-forming property.

In addition, the glass transition temperature of the polymer which forms the outer layer is preferably −30° C. or higher, and more preferably −20° C. or higher, from the viewpoint of suppress in tackiness (stickiness) and improvement in vertical-surface coating property, and preferably 40° C. or lower, more preferably 30° C. or lower, and furthermore preferably 20° C. or lower, from the viewpoint of improvement in low-temperature film-forming property.

The glass transition temperature of the polymer which forms the outer layer can be easily controlled by adjusting the kind and amount of the monomers which are used in the monomer component.

It is preferred that the total monomer component which forms an emulsion particle having an inner layer and an outer layer contains an alkyl (meth)acrylate having an alkyl group of 4 or more carbon atoms, which forms a homopolymer having a glass transition temperature of 60° C. or higher in a content of 25 to 95% by mass, from the viewpoint of obtaining a film-forming auxiliary which is comprehensively excellent in low-temperature film-forming property, warm water resistance, extensibility, weather resistance, vertical-surface coating property and warm water freezing stability.

The alkyl (meth)acrylate having an alkyl group of 4 or more carbon atoms, which forms a homopolymer having a glass transition temperature of 60° C. or higher includes, for example, cyclohexyl methacrylate, tert-butyl methacrylate, isobornyl methacrylate, 2,2,6,6-tetramethylpiperidyl methacrylate, 1,2,2,6,6-pentamethylpiperidyl methacrylate, and the like, and the present invention is not limited only to those exemplified ones. These alkyl (meth)acrylates can be used alone respectively, or two or more kinds thereof can be used in combination. Among these alkyl (meth)acrylates, from the viewpoint of obtaining a film-forming auxiliary which is comprehensively excellent in low-temperature film-forming property, warm water resistance, extensibility, weather resistance, vertical-surface coating property and warm water freezing stability, at least one compound selected from the group consisting of cyclohexyl methacrylate, tert-butyl methacrylate and isobornyl methacrylate is preferred.

The monomer other than the alkyl (meth)acrylate having an alkyl group of 4 or more carbon atoms, which forms a homopolymer having a glass transition temperature of 60° C. or higher includes the above-mentioned ethylenically unsaturated monomer other than the alkyl (meth)acrylate having an alkyl group of 4 or more carbon atoms, which forms a homopolymer having a glass transition temperature of 60° C. or higher, the above-mentioned aromatic monomer, and the like. These monomers can be used alone respectively, or two or more kinds thereof can be used in combination.

The content of the alkyl (meth)acrylate having an alkyl group of 4 or more carbon atoms, which forms a homopolymer having a glass transition temperature of 60° C. or higher in the total monomer components for forming the emulsion particle having an inner layer and an outer layer is 25 to 95% by mass, preferably 30 to 90% by mass, and furthermore preferably 30 to 85% by mass, from the viewpoint of obtaining a film-forming auxiliary which is comprehensively excellent in low-temperature film-forming property, warm water resistance, extensibility, weather resistance, vertical-surface coating property and warm water freezing stability. Therefore, the content of the monomer other than the alkyl (meth)acrylate having an alkyl group of 4 or more carbon atoms in the total monomer components for forming the emulsion particle is 5 to 75% by mass, preferably 10 to 70% by mass, and more preferably 15 to 70% by mass, from the viewpoint of obtaining a film-forming auxiliary which is comprehensively excellent in low-temperature film-forming property, warm water resistance, extensibility, weather resistance, vertical-surface coating property and warm water freezing stability.

In addition, the glass transition temperature of the whole of the polymer used in the emulsion particle having an inner layer and an outer layer is preferably −10° C. or higher, more preferably −5° C. or higher, and furthermore preferably 0° C. or higher, from the viewpoint of improvement in warm water resistance and weather resistance, and preferably 60° C. or lower, more preferably 55° C. or lower, and furthermore preferably 50° C. or lower from the viewpoint of improvement in low-temperature film-forming property, extensibility and warm water freezing stability.

Thus, the resin emulsion containing an emulsion particle having an inner layer and an outer layer can be obtained. Incidentally, a surface layer made of other polymer can be further formed on the surface of the outer layer as occasion demands within a scope which would not hinder an object of the present invention. In addition, in the present invention, other resin layer can be formed between the inner layer and the outer layer of the emulsion particle, and other inner layer can be further formed inside the inner layer as occasion demands within a scope which would not hinder an object of the present invention.

In the emulsion particle having an inner layer and an outer layer, the mass ratio of the inner layer to the outer layer [inner layer/outer layer] is preferably 10/90 to 90/10, and more preferably 25/75 to 75/25, from the viewpoint of obtaining a film-forming auxiliary which is comprehensively excellent in low-temperature film-forming property, warm water resistance, extensibility, weather resistance, vertical-surface coating property and warm water freezing stability. In addition, the total content of the inner layer and the outer layer in the emulsion particle is preferably 50% by mass or more, more preferably 65% by mass or more, from the viewpoint of obtaining a film-forming auxiliary which is comprehensively excellent in low-temperature film-forming property, warm water resistance, extensibility, weather resistance, vertical-surface coating property and warm water freezing stability. It is preferred that the higher the total content of the inner layer and the outer layer is in the emulsion particle, and the upper limit of the total content of the inner layer and the outer layer is 100% by mass.

When the emulsion particle has a multilayer structure, the number of the resin layers forming the multilayer structure is not particularly limited, and is preferably 2 to 5 layers, more preferably 2 to 4 layers, and furthermore preferably 2 to 3 layers.

In the present invention, solubility parameter (hereinafter, also referred to as SP value) of the total monomer components which are used as raw materials of the polymer which forms the emulsion particle is preferably 13.0 $(J/cm^3)^{1/2}$ or more, and more preferably 14.0 $(J/cm^3)^{1/2}$ or more, from the viewpoint of improvement in warm water freezing stability, and preferably 17.5 $(J/cm^3)^{1/2}$ or less, and more preferably 16.5 $(J/cm^3)^{1/2}$ or less, from the viewpoint of improvement in low-temperature film-forming property, warm water resistance and weather resistance.

The SP value of the monomer component means a SP value of the whole of the monomer component. The SP value of the monomer component can be determined in accordance with the Small's Equation represented by the equation:

$$\delta = [(\Sigma \Delta e1)(x)/(\Sigma \Delta Vm)(x)]^{1/2}$$

wherein δ represents a SP value of a monomer component; Δe1 represents a calculated value (J/mol) of energy of evaporation of each monomer which constitutes the monomer component; ΣΔe1 represents a total value (J/mol) of a calculated value of energy of evaporation of each monomer which constitutes the monomer component; ΔVm represents a calculated value ($cm^3$/mol) of the molecular volume of each monomer which constitutes the monomer component; ΣΔVm represents a total of calculated values of the molecular volumes of each monomer which constitutes the monomer component; and x represents a molar distribution of each monomer which constitutes the monomer component.

The SP value of the monomer component includes, for example, 18.9 $(J/cm^3)^{1/2}$ for 2-ethylhexyl acrylate, 28.8 $(J/cm^3)^{1/2}$ for acrylic acid, 20.4 $(J/cm^3)^{1/2}$ for methyl methacrylate, 15.0 $(J/cm^3)^{1/2}$ for styrene, 20.0 $(J/cm^3)^{1/2}$ for n-butyl acrylate, 25.7 $(J/cm^3)^{1/2}$ for methacrylic acid, 18.5 $(J/cm^3)^{1/2}$ for γ-methacryloyloxypropy-ltrimethoxysilane, 15.2 $(J/cm^3)^{1/2}$ for cyclohexyl methacrylate, 18.6 $(J/cm^3)^{1/2}$ for tert-butyl acrylate, 15.2 $(J/cm^3)^{1/2}$ for isobornyl methacrylate, 19.2 $(J/cm^3)^{1/2}$ for 1,2,2,6,6-pentamethylpiperidyl methacrylate, 20.1 $(J/cm^3)^{1/2}$ for 2,2,6,6-tetramethylpiperidyl methacrylate, and 19.4 $(J/cm^3)^{1/2}$ for n-butyl methacrylate.

The average particle diameter of the emulsion particles is preferably 30 nm or more, more preferably 50 nm or more, and furthermore preferably 70 nm or more, from the viewpoint of improvement in dispersion stability of an emulsion particle, and preferably 400 nm or less, more preferably 300 nm or less, and furthermore preferably 250 nm or less, from the viewpoint of obtaining a film-forming auxiliary which is comprehensively excellent in low-temperature film-forming property, warm water resistance, extensibility, weather resistance, vertical-surface coating property and warm water freezing stability.

Incidentally, in the present specification, the average particle diameter of the emulsion particles means a volume average particle diameter as determined by using a particle diameter distribution analyzer which employs a dynamic light scattering method [manufactured by Particle Sizing Systems, LLC, trade name: NICOMP Model 380].

The content of non-volatile components in the resin emulsion is preferably 30% by mass or more, and more preferably 35% by mass or more, from the viewpoint of improvement in low-temperature film-forming property, warm water resistance and vertical-surface coating property, and the content is preferably 70% by mass or less, and more preferably 65% by mass or less from the viewpoint of improvement in low-temperature film-forming property.

Incidentally, in the present specification, the content of a non-volatile component in the resin emulsion means a value obtained by weighing 1 g of the resin emulsion and drying the resin emulsion for one hour at a temperature of 110° C.

in a hot air dryer to give a residue as a non-volatile component, and determining by the equation:

[Content of a non-volatile component in resin emulsion(% by mass)]=([Mass of residue]÷[1 g of resin emulsion])×100.

The film-forming auxiliary of the present invention can be composed of only the above-mentioned resin emulsion, or may contain an additive within a scope which would not hinder an object of the present invention. The additive includes, for example, an ultraviolet absorbing agent, an ultraviolet stabilizing agent, a leveling agent, an oxidation inhibitor, a filler, a corrosion inhibitor, an antifungal agent, a dispersion stabilizing agent, a plasticizer, a fluorescent whitening agent, a surfactant, an antistatic agent, a flame retardant, a thickening agent, a defoaming agent, a pigment, a dye, an inorganic fine particle, a resin fine particle and the like, and the present invention is not limited only to those exemplified ones. Since the amount of the additive varies depending on the kind of the additive, the amount of the additive cannot be absolutely determined. Therefore, it is preferred that the amount of the additive is appropriately adjusted within a scope which would not hinder an object of the present invention.

The film-forming auxiliary of the present invention obtained in the above is comprehensively excellent in low-temperature film-forming property, warm water resistance, extensibility, weather resistance, vertical-surface coating property and warm water freezing stability, and can impart these properties to a fluororesin emulsion. Therefore, the film-forming auxiliary can be suitably used for the fluororesin emulsion.

The fluororesin emulsion includes, for example, a fluororesin emulsion of which fluororesin has one kind or two or more kinds of units such as a trifluoroethylene unit, a tetrafluoroethylene unit, a pentafluoropropylene unit, a hexafluoropropylene unit, a chlorotrifluoroethylene unit and a vinylidene fluoride unit and the like, and the present invention is not limited only to those exemplified ones. The fluororesin emulsion is easily commercially available. Examples of the fluororesin emulsion include trade name: LUMIFLON (registered trademark) manufactured by Asahi Glass Co., Ltd., trade name: ZEFFLE (registered trademark) manufactured by Daikin Industries, Ltd., trade name: CEFRAL COAT manufactured by Central Glass Co., Ltd. and the like, and the present invention is not limited only to those exemplified ones.

When the film-forming auxiliary of the present invention is added to the fluororesin emulsion, the amount of the film-forming auxiliary of the present invention cannot be absolutely determined, because the amount varies depending on kind and uses of the fluororesin emulsion and the like. The amount of the film-forming auxiliary of the present invention per 100 parts by mass of the solid content of the fluororesin emulsion is usually preferably 10 to 200 parts by mass, more preferably 20 to 150 parts by mass, and furthermore preferably 30 to 100 parts by mass.

In addition, since the film-forming auxiliary of the present invention is comprehensively excellent in low-temperature film-forming property, warm water resistance, extensibility, weather resistance, vertical-surface coating property and warm water freezing stability, the film-forming auxiliary is expected to be used in, for example, uses such as an aqueous coating or paint, a pressure-sensitive adhesive, an adhesive, and the like.

EXAMPLES

Next, the present invention will be more specifically described based on working examples. However, the present invention is not limited only to those working examples. Incidentally, in the followings, unless particularly noted otherwise, the unit "parts" means "parts by mass", and the unit "percent (%)" means "percent (%) by mass".

Example 1

A flask equipped with a dropping funnel, a stirrer, a nitrogen inlet tube, a thermometer and a reflux cooling tube was charged with 1010 parts of deionized water.

A dropping funnel was charged with 145 parts of deionized water, 60 parts of a 25% aqueous solution of an emulsifier [manufactured by ADEKA CORPORATION, trade name of ADEKA REASOAP SR-10], 40 parts of 2-ethylhexyl acrylate, 305 parts of methyl methacrylate, 150 parts of cyclohexyl methacrylate and 5 parts of methacrylic acid, to give a first-stage pre-emulsion.

The first-stage pre-emulsion obtained in the above in an amount of 71 parts which was equivalent to 5% of the total amount of the monomer component was added to the flask. While nitrogen gas was gently blown into the flask, the temperature of the contents in the flask was raised to 80° C., and 14 parts of a 3.5% aqueous solution of ammonium persulfate was added to the flask, to initiate emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask over a period of 90 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 145 parts of deionized water, 60 parts of a 25% aqueous solution of an emulsifier [manufactured by ADEKA CORPORATION, trade name of ADEKA REASOAP SR-10], 205 parts of 2-ethylhexyl acrylate, 250 parts of cyclohexyl methacrylate, 5 parts of 1,2,2,6,6-pentamethylpiperidyl methacrylate and 40 parts of n-butyl acrylate, 86 parts of a 3.5% aqueous solution of ammonium persulfate, and 40 parts of a 25% aqueous solution of sodium hydrogen sulfite were added dropwise to the flask over a period of 90 minutes. After the completion of the dropwise addition, the mixture in the flask was maintained at a temperature of 80° C. for 90 minutes, to terminate the second-stage emulsion polymerization. The reaction mixture thus obtained was cooled to room temperature, and 25% aqueous ammonia was added to the flask so that the pH of the content in the flask became 8 or higher as determined at 23° C. by using a pH meter [product No. F-23 manufactured by Horiba, Ltd., hereinafter referred to the same]. The mixture was filtered through a wire gauze having 300 mesh (JIS mesh, hereinafter referred to the same), to give an aqueous resin emulsion.

The average particle diameter of the emulsion particles included in the aqueous resin emulsion obtained in the above was 160 nm, the glass transition temperature of the polymer constituting the inner layer of the emulsion particle was 75° C., the glass transition temperature of the polymer constituting the outer layer was −11° C., the glass transition temperature of the whole of the polymers was 26° C., and the SP value of the monomer component was 16.1 $(J/cm^3)^{1/2}$. The aqueous resin emulsion thus obtained was used as a film-forming auxiliary A.

Example 2

A flask equipped with a dropping funnel, a stirrer, a nitrogen inlet tube, a thermometer and a reflux cooling tube was charged with 1010 parts of deionized water.

A dropping funnel was charged with 145 parts of deionized water, 60 parts of a 25% aqueous solution of an emulsifier [manufactured by ADEKA CORPORATION, trade name of ADEKA REASOAP SR-10], 40 parts of 2-ethylhexyl acrylate, 305 parts of methyl methacrylate, 50 parts of cyclohexyl methacrylate, 50 parts of tert-butyl methacrylate, 50 parts of isobornyl acrylate and 5 parts of acrylic acid, to give a first-stage pre-emulsion.

The first-stage pre-emulsion obtained in the above in amount of 28 parts which was equivalent to 2% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask over a period of 90 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 145 parts of deionized water, 60 parts of a 25% aqueous solution of an emulsifier [manufactured by ADEKA CORPORATION, trade name of ADEKA REASOAP SR-10], 145 parts of 2-ethylhexyl acrylate, 100 parts of cyclohexyl methacrylate, 100 parts of tert-butyl methacrylate, 100 parts of isobornyl acrylate, 5 parts of 1,2,2,6,6-pentamethylpiperidyl methacrylate and 50 parts of n-butyl acrylate, 86 parts of a 3.5% aqueous solution of ammonium persulfate, and 40 parts of a 25% aqueous solution of sodium hydrogen sulfite were added dropwise to the flask over a period of 90 minutes. After the completion of the dropwise addition, the mixture in the flask was maintained at a temperature of 80° C. for 90 minutes, to terminate the second-stage emulsion polymerization. The reaction mixture thus obtained was cooled to room temperature, and 25% aqueous ammonia was added to the flask so that the pH of the content in the flask became 8 or higher. The mixture was filtered through a wire gauze having 300 mesh, to give an aqueous resin emulsion.

The average particle diameter of the emulsion particles included in the aqueous resin emulsion obtained in the above was 230 nm, the glass transition temperature of the polymer constituting the inner layer of the emulsion particle was 78° C., the glass transition temperature of the polymer constituting the outer layer was 9° C., the glass transition temperature of the whole of the polymers was 40° C., and the SP value of the monomer component was 17.2 $(J/cm^3)^{1/2}$. The aqueous resin emulsion thus obtained was used as a film-forming auxiliary B.

Example 3

A flask equipped with a dropping funnel, a stirrer, a nitrogen inlet tube, a thermometer and a reflux cooling tube was charged with 1010 parts of deionized water.

A dropping funnel was charged with 145 parts of deionized water, 60 parts of a 25% aqueous solution of an emulsifier [manufactured by ADEKA CORPORATION, trade name of ADEKA REASOAP SR-10], 180 parts of methyl methacrylate, 50 parts of isobornyl acrylate, 250 parts of cyclohexyl methacrylate and 20 parts of n-butyl acrylate, to give a first-stage pre-emulsion.

The first-stage pre-emulsion obtained in the above in an amount of 113 parts which was equivalent to 8% of the total amount of the monomer component was added to the flask. While nitrogen gas was gently blown into the flask, the temperature in the flask was raised to 80° C. A 3.5% aqueous solution of ammonium persulfate in an amount of 14 parts was added to the flask, to initiate emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask for 90 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 145 parts of deionized water, 60 parts of a 25% aqueous solution of an emulsifier [manufactured by ADEKA CORPORATION under the trade name of ADEKA REASOAP SR-10], 145 parts of 2-ethylhexyl acrylate, 350 parts of cyclohexyl methacrylate and 5 parts of acrylic acid, 86 parts of a 3.5% aqueous solution of ammonium persulfate, and 40 parts of a 25% aqueous solution of sodium hydrogen sulfite were added dropwise to the flask over a period of 90 minutes. After the completion of the dropwise addition, the mixture in the flask was maintained at a temperature of 80° C. for 90 minutes, to terminate the second-stage emulsion polymerization. The reaction mixture thus obtained was cooled to room temperature, and 25% aqueous ammonia was added to the flask so that the pH of the content in the flask became 8 or higher. The mixture was filtered through a wire gauze having 300 mesh, to give an aqueous resin emulsion.

The average particle diameter of the emulsion particles included in the aqueous resin emulsion obtained in the above was 110 nm, the glass transition temperature of the polymer constituting the inner layer of the emulsion particle was 83° C., the glass transition temperature of the polymer constituting the outer layer was 19° C., the glass transition temperature of the whole of the polymers was 48° C., and the SP value of the monomer component was 15.5 $(J/cm^3)^{1/2}$. The aqueous resin emulsion thus obtained was used as a film-forming auxiliary C.

Example 4

A flask equipped with a dropping funnel, a stirrer, a nitrogen inlet tube, a thermometer and a reflux cooling tube was charged with 1010 parts of deionized water.

A dropping funnel was charged with 96 parts of deionized water, 40 parts of a 25% aqueous solution of an emulsifier [manufactured by ADEKA CORPORATION under the trade name of ADEKA REASOAP SR-10], 235 parts of methyl methacrylate, 100 parts of cyclohexyl methacrylate and 5 parts of methacrylic acid, to give a first-stage pre-emulsion.

The first-stage pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount 14 parts was added to the flask, to initiate a first emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask over a period of 60 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 97 parts of deionized water, 40 parts of a 25% aqueous solution of an emulsifier [manufactured by ADEKA CORPORATION under the trade name of ADEKA REASOAP SR-10], 75 parts of 2-ethylhexyl acrylate, 150 parts of cyclohexyl methacrylate, 50 parts of methyl methacrylate, 50 parts of n-butyl acrylate and 5 parts of 1,2,2,6,6-pentamethylpiperidyl methacrylate, 86 parts of a 3.5% aqueous solution of ammonium persulfate, and 40 parts of a 25% aqueous solution of sodium hydrogen sulfite were added dropwise to the flask over a period of 60 minutes. After the completion of the dropwise addition, the mixture in the flask was maintained at a temperature of 80° C. for 60 minutes, to terminate the second-stage emulsion polymerization.

Next, a third-stage pre-emulsion composed of 97 parts of deionized water, 40 parts of a 25% aqueous solution of an emulsifier [manufactured by ADEKA CORPORATION under the trade name of ADEKA REASOAP SR-10], 120 parts of 2-ethylhexyl acrylate, 200 parts of cyclohexyl methacrylate, 5 parts of 1,2,2,6,6-pentamethylpiperidyl methacrylate and 5 parts of γ-methacryloyloxypropyltrimethoxysilane, 86 parts of a 3.5% aqueous solution of ammonium persulfate, and 40 parts of a 25% aqueous solution of sodium hydrogen sulfite were added dropwise to the flask over a period of 60 minutes. After the completion of the dropwise addition, the mixture in the flask was maintained for 60 minutes at a temperature of 80° C., to terminate the third-stage emulsion polymerization. The reaction mixture thus obtained was cooled to room temperature, and 25% aqueous ammonia was added to the flask so that the pH of the content in the flask became 8 or higher. The mixture was filtered through a wire gauze having 300 mesh, to give an aqueous resin emulsion.

The average particle diameter of the emulsion particles included in the aqueous resin emulsion obtained in the above was 160 nm, the glass transition temperature of the polymer constituting the inner layer of the emulsion particle was 99° C., the glass transition temperature of the polymer constituting the outer layer was 7° C., the glass transition temperature of the whole of the polymers was 34° C., and the SP value of the monomer component was 16.0 $(J/cm^3)^{1/2}$. The aqueous resin emulsion thus obtained was used as a film-forming auxiliary D.

Example 5

A flask equipped with a dropping funnel, a stirrer, a nitrogen inlet tube, a thermometer and a reflux cooling tube was charged with 1010 parts of deionized water.

A dropping funnel was charged with 96 parts of deionized water, 40 parts of a 25% aqueous solution of an emulsifier [manufactured by ADEKA CORPORATION under the trade name of ADEKA REASOAP SR-10], 50 parts of cyclohexyl methacrylate, 50 parts of tert-butyl methacrylate, 50 parts of isobornyl acrylate, 165 parts of methyl methacrylate, 20 parts of 2-ethylhexyl acrylate and 5 parts of acrylic acid, to give a first-stage pre-emulsion.

The first-stage pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask over a period of 60 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 97 parts of deionized water, 40 parts of a 25% aqueous solution of an emulsifier [manufactured by ADEKA CORPORATION under the trade name of ADEKA REASOAP SR-10], 175 parts of 2-ethylhexyl acrylate, 50 parts of cyclohexyl methacrylate, 100 parts of n-butyl acrylate and 5 parts of acrylic acid, 86 parts of a 3.5% aqueous solution of ammonium persulfate, and 40 parts of a 25% aqueous solution of sodium hydrogen sulfite were added dropwise to the flask over a period of 60 minutes. After the completion of the dropwise addition, the mixture in the flask was maintained at a temperature of 80° C. for 60 minutes, to terminate the second-stage emulsion polymerization.

Next, a third-stage pre-emulsion composed of 97 parts of deionized water, 40 parts of a 25% aqueous solution of an emulsifier [manufactured by ADEKA CORPORATION under the trade name of ADEKA REASOAP SR-10], 50 parts of tert-butyl methacrylate, 30 parts of isobornyl acrylate, 50 parts of cyclohexyl methacrylate, 145 parts of 2-ethylhexyl acrylate, 50 parts of styrene and 5 parts of acrylic acid, 86 parts of a 3.5% aqueous solution of ammonium persulfate, and 40 parts of a 25% aqueous solution of sodium hydrogen sulfite were added dropwise to the flask over a period of 60 minutes. After the completion of the dropwise addition, the mixture in the flask was maintained for 60 minutes at a temperature of 80° C., to terminate the third-stage emulsion polymerization. The reaction mixture thus obtained was cooled to room temperature, and 25% aqueous ammonia was added to the flask so that the pH of the content in the flask became 8 or higher. The mixture was filtered through a wire gauze having 300 mesh, to give an aqueous resin emulsion.

The average particle diameter of the emulsion particles included in the aqueous resin emulsion obtained in the above was 160 nm, the glass transition temperature of the polymer constituting the inner layer of the emulsion particle was 83° C., the glass transition temperature of the polymer constituting the outer layer was −1° C., the glass transition temperature of the whole of the polymers was 1° C., and the SP value of the monomer component was 17.1 $(J/cm^3)^{1/2}$. The aqueous resin emulsion thus obtained was used as a film-forming auxiliary E.

Example 6

A flask equipped with a dropping funnel, a stirrer, a nitrogen inlet tube, a thermometer and a reflux cooling tube was charged with 1010 parts of deionized water.

A dropping funnel was charged with 96 parts of deionized water, 40 parts of a 25% aqueous solution of an emulsifier [manufactured by ADEKA CORPORATION under the trade name of ADEKA REASOAP SR-10], 250 parts of cyclohexyl methacrylate, 70 parts of isobornyl acrylate and 20 parts of n-butyl acrylate, to give a first-stage pre-emulsion.

The first-stage pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask over a period of 60 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 97 parts of deionized water, 40 parts of a 25% aqueous solution of an emulsifier [manufactured by ADEKA CORPORATION under the trade name of ADEKA REASOAP SR-10], 50 parts of 2-ethylhexyl acrylate, 100 parts of cyclohexyl methacrylate, 130 parts of methyl methacrylate and 50 parts of n-butyl acrylate, 86 parts of a 3.5% aqueous solution of ammonium persulfate, and 40 parts of a 25% aqueous solution of sodium hydrogen sulfite were added dropwise to the flask over a period of 60 minutes. After the completion of the dropwise addition, the mixture in the flask was maintained at a temperature of 80° C. for 60 minutes, to terminate the second-stage emulsion polymerization.

Next, a third-stage pre-emulsion composed of 97 parts of deionized water; 40 parts of a 25% aqueous solution of an emulsifier [manufactured by ADEKA CORPORATION under the trade name of ADEKA REASOAP SR-10], 175 parts of 2-ethylhexyl acrylate, 150 parts of cyclohexyl methacrylate and 5 parts of 1,2,2,6,6-pentamethylpiperidyl methacrylate, 86 parts of a 3.5% aqueous solution of ammonium persulfate, and 40 parts of a 25% aqueous solution of sodium hydrogen sulfite were added dropwise to the flask over a period of 60 minutes. After the completion of the dropwise addition, the mixture in the flask was maintained for 60 minutes at a temperature of 80° C., to terminate the third-stage emulsion polymerization. The reaction mixture thus obtained was cooled to room temperature, and 25% aqueous ammonia was added to the flask so that the pH of the content in the flask became 8 or higher. The mixture was filtered through a wire gauze having 300 mesh, to give an aqueous resin emulsion.

The average particle diameter of the emulsion particles included in the aqueous resin emulsion obtained in the above was 160 nm, the glass transition temperature of the polymer constituting the inner layer of the emulsion particle was 73° C., the glass transition temperature of the polymer constituting the outer layer was −18° C., the glass transition temperature of the whole of the polymers was 23° C., and the SP value of the monomer component was 16.0 $(J/cm^3)^{1/2}$. The aqueous resin emulsion thus obtained was used as a film-forming auxiliary F.

Example 7

A flask equipped with a dropping funnel, a stirrer, a nitrogen inlet tube, a thermometer and a reflux cooling tube was charged with 1010 parts of deionized water.

A dropping funnel was charged with 290 parts of deionized water, 120 parts of a 25% aqueous solution of an emulsifier [manufactured by ADEKA CORPORATION under the trade name of ADEKA REASOAP SR-10], 245 parts of 2-ethylhexyl acrylate, 40 parts of n-butyl acrylate, 400 parts of cyclohexyl methacrylate, 305 parts of methyl methacrylate and 10 parts of methacrylic acid, to give a first-stage pre-emulsion.

The pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 150 nm, the glass transition temperature of the polymer constituting the emulsion particle was 26° C., and the SP value of the monomer component was 7.84 $(J/cm^3)^{1/2}$. The aqueous resin emulsion thus obtained was used as a film-forming auxiliary G.

Example 8

A flask equipped with a dropping funnel, a stirrer, a nitrogen inlet tube, a thermometer and a reflux cooling tube was charged with 1010 parts of deionized water.

A dropping funnel was charged with 290 parts of deionized water, 60 parts of a 25% aqueous solution of an emulsifier [manufactured by ADEKA CORPORATION under the trade name of ADEKA REASOAP SR-10], 60 parts of a 25% aqueous solution of an emulsifier [manufactured by ADEKA CORPORATION under the trade name of ADEKA REASOAP ER-20], 185 parts of 2-ethylhexyl acrylate, 50 parts of n-butyl acrylate, 150 parts of cyclohexyl methacrylate, 150 parts of tert-butyl methacrylate, 150 parts of isobornyl methacrylate, 305 parts of methyl methacrylate and 10 parts of 1,2,2,6,6-pentamethylpiperidyl methacrylate, to give a first-stage pre-emulsion.

The pre-emulsion obtained in the above in an amount of 28 parts which was equivalent to 2% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 240 nm, the glass transition temperature of the polymer constituting the emulsion particle was 40° C., and the SP value of the monomer component was 8.38 $(J/cm^3)^{1/2}$. The aqueous resin emulsion thus obtained was used as a film-forming auxiliary H.

Example 9

A flask equipped with a dropping funnel, a stirrer, a nitrogen inlet tube, a thermometer and a reflux cooling tube was charged with 1010 parts of deionized water.

A dropping funnel was charged with 290 parts of deionized water, 120 parts of a 25% aqueous solution of an emulsifier [manufactured by ADEKA CORPORATION under the trade name of ADEKA REASOAP 8R-10], 145 parts of 2-ethylhexyl acrylate, 20 parts of n-butyl acrylate, 600 parts of cyclohexyl methacrylate, 50 parts of isobornyl methacrylate, 180 parts of methyl methacrylate and 5 parts of acrylic acid, to give a first-stage pre-emulsion.

The pre-emulsion obtained in the above in an amount of 114 parts which was equivalent to 8% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 110 nm, the glass transition temperature of the polymer constituting the emulsion particle was 48° C., and the SP value of the monomer component was 7.57 $(J/cm^3)^{1/2}$. The aqueous resin emulsion thus obtained was used as a film-forming auxiliary I.

Example 10

A flask equipped with a dropping funnel, a stirrer, a nitrogen inlet tube, a thermometer and a reflux cooling tube was charged with 1010 parts of deionized water.

A dropping funnel was charged with 290 parts of deionized water, 120 parts of a 25% aqueous solution of an emulsifier [manufactured by ADEKA CORPORATION under the trade name of ADEKA REASOAP SR-10], 195 parts of 2-ethylhexyl acrylate, 50 parts of n-butyl acrylate, 450 parts of cyclohexyl methacrylate, 285 parts of methyl methacrylate, 10 parts of 1,2,2,6,6-pentamethylpiperidyl methacrylate and 10 parts of γ-methacryloyloxypropyl-trimethoxysilane, to give a first-stage pre-emulsion.

The pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 150 nm, the glass transition temperature of the polymer constituting the emulsion particle was 34° C., and the SP value of the monomer component was 7.83 $(J/cm^3)^{1/2}$. The aqueous resin emulsion thus obtained was used as a film-forming auxiliary J.

Example 11

A flask equipped with a dropping funnel, a stirrer, a nitrogen inlet tube, a thermometer and a reflux cooling tube was charged with 1010 parts of deionized water.

A dropping funnel was charged with 290 parts of deionized water, 90 parts of a 25% aqueous solution of an emulsifier [manufactured by ADEKA CORPORATION under the trade name of ADEKA REASOAP SR-10], 30 parts of a 25% aqueous solution of an emulsifier [manufactured by ADEKA CORPORATION under the trade name of ADEKA REASOAP ER-20], 340 parts of 2-ethylhexyl acrylate, 100 parts of n-butyl acrylate, 150 parts of cyclohexyl methacrylate, 100 parts of tert-butyl methacrylate, 80 parts of isobornyl methacrylate, 165 parts of methyl methacrylate, 50 parts of styrene and 15 parts of acrylic acid, to give a first-stage pre-emulsion.

The pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 150 nm, the glass transition temperature of the polymer constituting the emulsion particle was 1° C., and the SP value of the monomer component was 8.33 $(J/cm^3)^{1/2}$ The aqueous resin emulsion thus obtained was used as a film-forming auxiliary K.

Example 12

A flask equipped with a dropping funnel, a stirrer, a nitrogen inlet tube, a thermometer and a reflux cooling tube was charged with 1010 parts of deionized water.

A dropping funnel was charged with 290 parts of deionized water, 120 parts of a 25% aqueous solution of an emulsifier [manufactured by ADEKA CORPORATION under the trade name of ADEKA REASOAP SR-10], 225 parts of 2-ethylhexyl acrylate, 70 parts of n-butyl acrylate, 500 parts of cyclohexyl methacrylate, 70 parts of isobornyl methacrylate, 130 parts of methyl methacrylate and 5 parts of 1,2,2,6,6-pentamethylpiperidyl methacrylate, to give a first-stage pre-emulsion.

The pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 160 nm, the glass transition temperature of the polymer constituting the emulsion particle was 23° C., and the SP value of the monomer component was 7.82 $(J/cm^3)^{1/2}$. The aqueous resin emulsion thus obtained was used as a film-forming auxiliary L.

Comparative Example 1

A flask equipped with a dropping funnel, a stirrer, a nitrogen inlet tube, a thermometer and a reflux cooling tube was charged with 1010 parts of deionized water.

A dropping funnel was charged with 290 parts of deionized water, 120 parts of a 25% aqueous solution of an emulsifier [manufactured by ADEKA CORPORATION under the trade name of ADEKA REASOAP SR-10], 25 parts of 2-ethylhexyl acrylate, 175 parts of n-butyl methacrylate, 380 parts of cyclohexyl methacrylate, 50 parts of tert-butyl methacrylate, 350 parts of isobornyl acrylate and 20 parts of acrylic acid, to give a first-stage pre-emulsion.

The pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining pre-emulsion was added dropwise to the flask over a period of 180 minutes. After the completion of the dropwise addition, the mixture in the flask was maintained at a temperature of 80° C. for 120 minutes, and 25% aqueous ammonia was added to the flask so that the pH of the content in the flask became to 9, to terminate emulsion polymerization.

The reaction mixture obtained in the above was cooled to room temperature, and filtered through a wire gauze having 300 mesh, to give an aqueous resin emulsion.

The average particle diameter of the emulsion particles included in the aqueous resin emulsion obtained in the above was 160 nm, the glass transition temperature of the polymer constituting the emulsion particle was 70° C., and the SP value of the monomer component was 16.5 $(J/cm^3)^{1/2}$. The aqueous resin emulsion thus obtained was used as a film-forming auxiliary M.

Comparative Example 2

A flask equipped with a dropping funnel, a stirrer, a nitrogen inlet tube, a thermometer and a reflux cooling tube was charged with 1010 parts of deionized water.

A dropping funnel was charged with 145 parts of deionized water, 60 parts of a 25% aqueous solution of an emulsifier [manufactured by ADEKA CORPORATION under the trade name of ADEKA REASOAP SR-10], 290 parts of 2-ethylhexyl acrylate, 200 parts of methyl methacrylate and 10 parts of methacrylic acid, to give a first-stage pre-emulsion.

The first-stage pre-emulsion obtained in the above in an amount of 71 parts which was equivalent to 5% of the total amount of the monomer component was added to the flask. While nitrogen gas was gently blown into the flask, the temperature was raised to 80° C. A 3.5% aqueous solution of ammonium persulfate in an amount of 14 parts was added to the flask, to initiate a first emulsion polymerization.

Next, the remaining first-stage pre-emulsion, 86 parts of a 3.5% aqueous solution of ammonium persulfate and 40 parts of a 25% aqueous solution of sodium hydrogen sulfite were added dropwise to the flask over a period of 90 minutes. After the completion of the dropwise addition, the mixture in the flask was maintained at a temperature of 80° C. for 60 minutes, to terminate the first-stage emulsion polymerization.

Thereafter, a second-stage pre-emulsion composed of 145 parts of deionized water, 60 parts of a 25% aqueous solution of an emulsifier [manufactured by ADEKA CORPORATION under the trade name of ADEKA REASOAP SR-10], 50 parts of 2-ethylhexyl acrylate, 340 parts of methyl methacrylate, 50 parts of tert-butyl methacrylate, 50 parts of n-butyl acrylate and 10 parts of acrylic acid, 86 parts of a 3.5% aqueous solution of ammonium persulfate, and 40 parts of a 25% aqueous solution of sodium hydrogen sulfite were added dropwise to the flask over a period of 90 minutes. After the completion of the dropwise addition, the mixture in the flask was maintained at a temperature of 80° C. for 90 minutes, to terminate the second-stage emulsion polymerization. The reaction mixture thus obtained was cooled to room temperature, and 25% aqueous ammonia was added to the flask so that the pH of the content in the flask became 8 or higher. The resultant was filtered through a wire gauze having 300 mesh, to give an aqueous resin emulsion.

The average particle diameter of the emulsion particles included in the aqueous resin emulsion obtained in the above was 160 nm, the glass transition temperature of the polymer constituting the inner layer of the emulsion particle was −21° C., the glass transition temperature of the polymer constituting the outer layer was 53° C., the glass transition temperature of the whole of the polymers was 11° C., and the SP value of the monomer component was 19.8 $(J/cm^3)^{1/2}$. The aqueous resin emulsion thus obtained was used as a film-forming auxiliary N.

Production Example 1

A stirrer-equipped autoclave made of stainless steel and having an internal capacity of 2.5 L (liters) was charged with 860 parts of ion-exchanged water, 35 parts of acrylic acid, 7 parts of an anionic surfactant [manufactured by Sumitomo 3M, Ltd. under the trade name of FLUORAD FC-143] and 47 parts of tert-butanol, and the inside of the autoclave was degassed. Thereafter, the inside of the autoclave was purged with nitrogen gas.

Next, 80 parts of a monomer mixture composed of 50% by mole of chlorotrifluoroethylene, 25% by mole of cyclohexyl vinyl ether, 10% by mole of hydroxybutyl vinyl ether, 10% by mole of ethylene and 5% by mole of ethylene glycol was introduced into this autoclave. When the temperature inside the autoclave attained to 70° C., and the inside pressure attained to 1.3 MPa, 2 parts of a 25% aqueous solution of ammonium persulfate was added to the autoclave, to initiate a reaction. When the inside pressure of the autoclave was lowered, 600 parts of a monomer mixture composed of 50% by mole of chlorotrifluoroethylene, 25% by mole of cyclohexyl vinyl ether, 10% by mole of hydroxybutyl vinyl ether, 10% by mole of ethylene and 5% by mole of ethylene glycol, and 30 parts of a 25% aqueous solution of ammonium persulfate were continuously introduced into the autoclave. After 6 hours passed, the autoclave was cooled with water to room temperature. Thereafter, unreacted monomers inside the autoclave were taken out from the autoclave, and the autoclave was opened, to give a fluororesin emulsion A having a solid content of 39.8%.

Production Example 2

A stirrer-equipped autoclave made of stainless steel and having an internal capacity of 2.5 L (liters) was charged with 860 parts of ion-exchanged water, 35 parts of acrylic acid, 7 parts of an anionic surfactant [manufactured by Sumitomo 3M, Ltd. under the trade name of FLUORAD FC-143] and 47 parts of tert-butanol, and the inside of the autoclave was degassed. Thereafter, the inside of the autoclave was purged with nitrogen gas.

Next, 75 parts of a monomer mixture composed of 35% by mole of vinylidene fluoride, 35% by mole of chlorotrifluoroethylene, 20% by mole of cyclohexyl vinyl ether, 5% by mole of hydroxybutyl vinyl ether and 5% by mole of ethylene glycol was introduced into this autoclave. When the temperature inside the autoclave attained to 70° C., and inside pressure of the autoclave attained to 0.8 MPa, 2 parts of a 25% aqueous solution of ammonium persulfate was added to the autoclave, to initiate a reaction. When the inside pressure was lowered, 600 parts of a monomer mixture composed of 35% by mole of vinylidene fluoride, 35% by mole of chlorotrifluoroethylene, 20% by mole of cyclohexyl vinyl ether, 5% by mole of hydroxybutyl vinyl ether and 5% by mole of ethylene glycol, and 30 parts of a 25% aqueous solution of ammonium persulfate were continuously introduced into the autoclave. After 6 hours passed, the autoclave was cooled with water to room temperature. Thereafter, unreacted monomers inside the autoclave were taken out from the autoclave, and the autoclave was opened, to give a fluororesin emulsion B having a solid content of 40.1%.

Production Example 3

The fluororesin emulsion A obtained in Production Example 1 in an amount of 50 parts was mixed with 50 parts of the fluororesin emulsion B obtained in Production Example 2, to give a fluororesin emulsion C.

Experiment Example

The film-forming auxiliary and the fluororesin emulsion shown in Table 1 were used. The film-forming auxiliary was used in an amount as shown in Table 1 per 100 parts of the fluororesin emulsion, and the fluororesin emulsion was mixed with the film-forming auxiliary. To the obtained mixture, 10 parts of 2,2,4-trimethyl-1,3-pentanediol monoisobutyrate [manufactured by CHISSO CORPORATION under the product number of OCS-12] was added, and the resulting mixture was stirred for 10 minutes by means of a HOMO DISPER at a rotation speed of 1000 $min^{-1}$ so as to be a uniform composition. Thereafter, 0.5 parts of a defoaming agent [manufactured by San Nopco, Ltd. under the trade name of NOPCO 8034L] was added to the mixture, and a thickening agent [manufactured by ADEKA CORPORATION under the trade name of ADEKANOL UH-420] was added to the mixture so that the viscosity as determined at 25° C. by means of a Krebs Unit Viscometer [manufactured by Brookfield Ametek, Inc. under the product number of KU-1] became 80 KU. The mixture was stirred for 30 minutes so as to be uniform, to give a sample for evaluation.

Next, the following physical properties were examined by using the sample for evaluation obtained in the above. The results are shown in Table 1.

[Low-Temperature Film-Forming Property]

The sample for evaluation was applied to glass plate (length: 75 mm, width: 150 mm, thickness: 2 mm) which was controlled to 10° C. by using a 6-mil applicator, and the sample for evaluation was dried for 3 hours in a thermostat having a temperature of 10° C. Thereafter, the presence or absence of a crack on the formed coating film was observed by naked eyes, and low-temperature film-forming property was evaluated in accordance with following evaluation criteria.

(Evaluation Criteria)

+++: No crack is observed on the coating film.

++: A small crack (length: less than 5 mm) is observed on the coating film.

+: A large crack (length: 5 mm or more and less than 10 mm) is observed on the coating film.

−: A larger crack (length: 10 mm or more) is observed on the coating film.

[Warm Water Resistance]

In accordance with JIS K6717 (2006), the sample for evaluation was applied to a black acrylic resin plate [manufactured by Nippon Testpanel Co., Ltd., length: 75 mm, width: 150 mm, thickness: 3 mm, L value as determined by a spectroscopic colorimeter [manufactured by Nippon Denshoku Industries Co., Ltd. under the product number of SE-2000]: 2] which was produced by extrusion molding polymethyl methacrylate containing a black pigment by means of a 6-mil applicator, and the sample for evaluation was dried at 100° C. for 30 minutes by means of a hot dryer, to give a test plate.

Next, the test plate obtained in the above was aged for 24 hours in an atmosphere of 23° C., and dipped in warm water of 50° C. for 24 hours. Thereafter, the test plate was taken out from the warm water, and dried at room temperature (about 23° C.) in the air for 24 hours. Then, the L value of the test plate was determined by using a spectroscopic colorimeter [manufactured by Nippon Denshoku Industries Co., Ltd. under the product number of SE-2000], and warm water resistance was evaluated in accordance with the following evaluation criteria.

(Evaluation Criteria)

+++: The L value is less than 5.

++: The L value is 5 or more and less than 10.

+: The L value is 10 or more and less than 20.

−: The L value is 20 or more.

[Extensibility]

A release paper was adhered to a glass plate through a double-sided adhesive tape, and the sample for evaluation was applied to the release paper so that a film thickness after drying was 100 to 150 μm. The sample for evaluation was dried at 23° C. in the air for one week, and then the formed coating film (length: 1 cm, width: 7 cm) was peeled off from the release paper. The elongation at break of the obtained coating film was determined in the air at 10° C. by means of a tensile tester [manufactured by Shimadzu Corp. under the trade name of AUTOGRAPH AGS-100D] under the conditions of an initial gauge length of 50 mm and a tensile rate of 50 mm/min. The draw ratio was determined by the equation:

[Draw ratio(%)]={[Elongation at break−50 mm]÷[50 mm]}×100 and extensibility was evaluated in accordance with the following evaluation criteria.

(Evaluation Criteria)
+++: The draw ratio is 100% or higher.
++: The draw ratio is 50% or higher and lower than 100%.
+: The draw ratio is 20% or higher and lower than 50%.
−: The draw ratio is lower than 20%.

[Weather Resistance]

A white paste was prepared by dispersing 60 parts of a dispersant [manufactured by Kao Corporation under the trade name of DEMOL EP], 50 parts of a dispersant [manufactured by Daiichi Kogyo Seiyaku Co., Ltd. under the trade name of DISCOAT N-14], 10 parts of a wetting agent [manufactured by Kao Corporation under the trade name of EMULGEN L8-106], 60 parts of propylene glycol, 210 parts of deionized water, 1000 parts of titanium oxide [manufactured by Ishihara Sangyo Kaisha, Ltd. under the product number of CR-95] and 10 parts of a foam suppressant [manufactured by San Nopco, Ltd. under the trade name of NOPCO 8034L] for 60 minutes at a rotation speed of 3,000 $min^{-1}$ by means of a HOMO DISPER.

Next, an enamel coating material was prepared by mixing 300 parts of an acrylic resin emulsion [manufactured by NIPPON SHOKUBAI CO., LTD. under the trade name of ACRYSET EX-35], 135 parts of the white paste obtained in the above, 30 parts of 2,2,4-trimethyl-1,3-pentanediol monoisobutyrate [manufactured by CHISSO CORPORATION under the product number of CS-12], 10 parts of a black paste [manufactured by Yokohama Chemicals Co., Ltd. under the trade name of UNILANT 88, conc black] and 1.5 parts of a defoaming agent [manufactured by San Nopco Co., Ltd. under the trade name of NOPCO 8034L].

A solvent-based sealer [manufactured by SK Kaken Co., Ltd. under the trade name of EX SEALER] was applied to a slate board [manufactured by Nippon Testpanel Co., Ltd., length: 70 mm, width: 150 mm and thickness: 6 mm] according to JIS A5430 (2004) by air spraying so that the amount of coating after drying was 20 $g/m^2$, and the solvent-based sealer was dried at 23° C. for 24 hours in the air. Thereafter, the above-mentioned enamel coating material was applied to the sealer-coated surface by means of a 6-mil applicator, and the enamel coating material was dried for 10 minutes by means of a hot air dryer of 100° C.

Next, the sample for evaluation was applied to surface on which the enamel coating material was applied by means of a 6-mil applicator, and dried for 30 minutes by means of a hot air dryer of 100° C., to give a test plate. This test plate was aged at 23° C. in the air for 24 hours.

The lateral surfaces and the back surface of the test plate after aging were sealed by adhering an aluminum tape, and the color differences ($L_0$, $a_0$ and $b_0$) of the test plate were determined by means of a colorimeter [manufactured by Nippon Denshoku Industries Co., Ltd. under the trade name of SPECTROSCOPIC COLORIMETER SE-2000]. A test for evaluating weather resistance was carried out for 1000 hours under the following test conditions for weather resistance test.

(Test Conditions for Weather Resistance Test)
Testing machine for weather resistance: a METAL WEATHER [manufactured by Daipla Wintes Co., Ltd. under the product number of KU-R4]

Irradiation: irradiated with ultraviolet radiation for 4 hours in an atmosphere having a temperature of 60° C. and a relative humidity of 50% (irradiation intensity: 80 $mW/cm^2$)

Wetting: irradiated with ultraviolet radiation for 4 hours in an atmosphere having a temperature of 35° C. and a relative humidity of 98% (irradiation intensity: 80 $mW/cm^2$)

Water-shower: for 30 seconds before and after wetting

After the completion of the weather resistance test, the color differences ($L_1$, $a_1$ and $b_1$) of the surface of the coating film on the test plate were determined by means of the above-mentioned colorimeter, and the change of the E value (ΔE) was obtained from the equation:

$$\Delta E = [(L_1 - L_0)^2 + (a_1 - a_0)^2 + (b_1 - b_0)^2]^{1/2}$$

and weather resistance was evaluated in accordance with the following evaluation criteria.

(Evaluation Criteria)
+++: ΔE is less than 3.
++: ΔE is 3 or more and less than 5.
+: ΔE is 5 or more and less than 10.
−: ΔE is 10 or more.

[Vertical-Surface Coating Property]

A white paste was prepared by dispersing 60 parts of a dispersant [manufactured by Kao Corporation under the trade name of DEMOL EP], 50 parts of a dispersant [manufactured by DKS Co., Ltd. under the trade name of DISCOAT N-14], 10 parts of a wetting agent [manufactured by Kao Corporation under the trade name of EMULGEN LS-106], 60 parts of propylene glycol, 210 parts of deionized water, 1000 parts of titanium oxide [manufactured by Ishihara Sangyo Kaisha, Ltd. under the product number of CR-95] and 10 parts of a foam suppressant [manufactured by San Nopco Co., Ltd. under the trade name of NOPCO 8034L] by means of a HOMO DISPER at a rotation speed of 3000 $min^{-1}$ for 60 minutes.

An enamel coating material was prepared by mixing 100 parts of the sample for evaluation, 45 parts of the white paste and 5 parts of a black paste [manufactured by Yokohama Chemicals Co., Ltd. under the trade name of UNILANT 88, cone black], adding a thickening agent [manufactured by NIPPON SHOKUBAI CO., LTD. under the trade name of ACRYSET WR-503A] to the resulting mixture so that the viscosity of the mixture as determined at 25° C. by means of a Krebs Unit Viscometer [manufactured by Brookfield Ametek, Inc. under the product number of KU-1] became 65 KU, and stirring the resulting mixture for 30 minutes so as to be uniform.

The above-mentioned enamel coating material was applied to a glass plate (length: 150 mm, width: 150 mm, thickness: 2.0 mm) by means of a 10-mil applicator, and the glass plate was allowed to stand in a vertical position in the air of 23° C. for 30 minutes. Thereafter, the formed coating film was observed with naked eyes, and the coating film was evaluated in accordance with the following evaluation criteria.

(Evaluation Criteria)
+++: The length of collapsed coating from the upper end of the coated surface of the glass plate is less than 5 mm.
++: The length of collapsed coating from the upper end of the coated surface of the glass plate is 5 mm or more and less than 20 mm.
+: The length of collapsed coating from the upper end of the coated surface of the glass plate is 20 mm or more and less than 30 mm.
−: The length of collapsed coating from the upper end of the coated surface of the glass plate is 30 mm or more.

[Warm Water Freezing Stability]

A test plate was produced in the same manner as in producing a test plate for examining the above-mentioned weather resistance, and this test plate was aged in the air of 23° C. for 24 hours.

The lateral surfaces and the back surface of the test plate after aging were sealed with a two-liquid curable type solvent-based resin. Thereafter, one cycle composed of the procedures for "dipping the test plate in warm water of 50° C. for 3 hours, freezing the test plate in the air of −20° C. for 2 hours, dipping the test plate in warm water of 50° C. for 3 hours, and drying the test plate in the air of 20° C. for 16 hours (total period of time: 24 hours) was repeated. After each cycle was carried out, the coating film was observed with naked eyes by using a magnifying glass at a magnification ratio of 30 times, and the number of cycles was counted until a crack was generated. The warm water freezing stability was evaluated in accordance with the following evaluation criteria.

(Evaluation Criteria)

+++: There is no problem at 30 cycles.

++: There is no problem at 20 cycles, but a crack is generated up to 30 cycles.

+: There is no problem at 10 cycles, but a crack is generated up to 20 cycles.

−: A Crack is generated up to 10 cycles.

Incidentally, when a film-forming auxiliary has an evaluation of "−" in the above-mentioned physical properties, the film-forming auxiliary is judged to be rejected.

Next, the evaluation of +++ was scored as 30 points, the evaluation of ++ was scored as 20 points, the evaluation of + was scored as 10 points, and the evaluation of − was scored as 0 points. The sum of the scores of all physical properties was calculated, and a comprehensive evaluation was carried out based on the sum. The results are shown in Table 1.

TABLE 1

| | | Experiment No. | | | | | | | | | |
|---|---|---|---|---|---|---|---|---|---|---|---|
| | | 1 | 2 | 3 | 4 | 5 | 6 | 7 | 8 | 9 | 10 |
| Kind of film-forming auxiliary and amount thereof (parts) | | A (10) | A (30) | A (50) | B (30) | C (30) | D (30) | E (50) | F (30) | G (50) | H (30) |
| Kind of fluororesin Em | | A | A | A | B | A | C | C | A | A | A |
| Evaluation of properties | Low-temperature film-forming property | + | ++ | ++ | ++ | ++ | ++ | +++ | ++ | ++ | + |
| | Warm water resistance | ++ | ++ | +++ | + | +++ | ++ | + | ++ | +++ | + |
| | Extensibility | ++ | ++ | +++ | + | + | ++ | +++ | +++ | ++ | + |
| | Weather resistance | +++ | ++ | ++ | ++ | +++ | +++ | + | +++ | ++ | ++ |
| | Vertical-surface coating property | ++ | ++ | ++ | ++ | +++ | ++ | ++ | ++ | ++ | ++ |
| | Warm water freezing stability | + | ++ | ++ | ++ | ++ | ++ | +++ | ++ | ++ | ++ |
| Comprehensive evaluation | | 110 | 120 | 140 | 100 | 140 | 130 | 130 | 140 | 130 | 90 |

| | | Experiment No. | | | | | | |
|---|---|---|---|---|---|---|---|---|
| | | 11 | 12 | 13 | 14 | Comp. 1 | Comp. 2 | Comp. 3 |
| Kind of film-forming auxiliary and amount thereof (parts) | | I (30) | J (30) | K (50) | L (30) | M (30) | N (50) | — |
| Kind of fluororesin Em | | A | C | C | A | A | C | A |
| Evaluation of properties | Low-temperature film-forming property | + | ++ | ++ | ++ | − | + | − |
| | Warm water resistance | ++ | ++ | + | ++ | + | − | − |
| | Extensibility | + | + | ++ | ++ | − | ++ | − |
| | Weather resistance | +++ | +++ | + | +++ | ++ | − | ++ |
| | Vertical-surface coating property | +++ | ++ | ++ | ++ | ++ | ++ | − |
| | Warm water freezing stability | ++ | ++ | +++ | ++ | − | + | − |
| Comprehensive evaluation | | 120 | 120 | 110 | 130 | 50 | 60 | 20 |

(Remarks)
Em: emulsion

From the results shown in Table 1, it can be seen that all of the film-forming auxiliaries obtained in the working examples are comprehensively excellent in low-temperature film-forming property, warm water resistance, extensibility, weather resistance, vertical-surface coating property and warm water freezing stability.

The invention claimed is:

1. A film-forming auxiliary in a fluorine resin emulsion, comprising an emulsion particle, wherein the emulsion particle comprises a polymer made of a monomer component for the emulsion particle,
    wherein the monomer component for the emulsion particle comprises a reactive emulsifier,
    wherein the emulsion particle has two layers of an inner layer and an outer layer, or three layers of an inner layer, a middle layer and an outer layer, and wherein a monomer component for forming the inner layer comprises 20 to 100% by mass of an alkyl (meth)acrylate having an alkyl group of 4 to 12 carbon atoms, and 0 to 80% by mass of a monomer selected from an alkyl (meth)acrylate having 1 to 3 carbon atoms and (meth)acrylic acid.

2. The film-forming auxiliary according to claim 1, wherein the reactive emulsifier is at least one member selected from the group consisting of a propenyl alkyl sulfosuccinic acid ester salt, a (meth)acrylic acid polyoxyethylene sulfonate salt, a (meth)acrylic acid polyoxyethylene phosphate salt, a polyoxyethylene alkyl propenyl phenyl ether sulfonate salt, a sulfonate salt of an allyloxymethyl alkyloxy polyoxyethylene, a sulfonate salt of an allyloxymethyl nonylphenoxyethyl hydroxypolyoxyethylene, an allyloxymethyl alkoxyethyl hydroxypolyoxyethylene sulfuric acid ester salt, a bis(polyoxyethylene polycyclic phenyl ether) methacrylated sulfonate salt, allyloxymethyl alkoxyethyl hydroxypolyoxyethylene, a polyoxyethylene alkylpropenyl phenyl ether, and an allyloxymethyl nonylphenoxyethyl hydroxypolyoxyethylene.

3. The film-forming auxiliary according to claim 1, wherein the amount of the reactive emulsifier per 100 parts by mass of the monomer component for the emulsion particle is 0.5 to 10 parts by mass.

4. The film-forming auxiliary according to claim 1, wherein the monomer component for the emulsion particle comprises 20 to 70% by mass of a (meth)acrylate having an alicyclic structure.

5. The film-forming auxiliary according to claim 1, wherein the whole of the polymer in the emulsion particle has a glass transition temperature of −10 to 60° C.

6. The film-forming auxiliary according to claim 1, wherein a monomer component forming the outer layer comprises 20 to 95% by mass of cyclohexyl (meth)acrylate.

7. The film-forming auxiliary according to claim 1, wherein the glass transition temperature of a polymer forming the outer layer is −30 to 40° C.

8. The film-forming auxiliary according to claim 1, wherein the alkyl (meth)acrylate having an alkyl group of 4 to 12 carbon atoms is an alkyl (meth)acrylate having an alkyl group of 4 to 8 carbon atoms.

9. The film-forming auxiliary according to claim 1, wherein a glass transition temperature of a polymer forming the inner layer is 60 to 180° C.

10. A composition comprising a film-forming auxiliary according to claim 1 and a fluororesin emulsion.

11. The composition according to claim 10, wherein the amount of the film-forming auxiliary is 10 to 200 parts by mass per 100 parts by mass of the solid content of the fluororesin emulsion.

12. An aqueous coating which comprises the composition according to claim 10.

13. An aqueous paint which comprises the composition according to claim 10.

14. An aqueous pressure-sensitive adhesive which comprises the composition according to claim 10.

15. An aqueous adhesive which comprises the composition according to claim 10.

16. The film-forming auxiliary according to claim 9, wherein a glass transition temperature of a polymer for forming the outer layer is −30 to 40° C., wherein a monomer component for forming the outer layer comprises 30 to 95% by mass of an alkyl (meth)acrylate having an alkyl group of 4 or more carbon atoms, which forms a homopolymer having a glass transition temperature of 60° C. or higher, and wherein total monomer components for forming the emulsion particle comprise 25 to 95% by mass of the alkyl (meth)acrylate having an alkyl group of 4 or more carbon atoms, which forms a homopolymer having a glass transition temperature of 60° C. or higher.

17. The film-forming auxiliary according to claim 16, wherein the total monomer components for forming the emulsion particle comprise 30 to 95% by mass of the alkyl (meth)acrylate having an alkyl group of 4 or more carbon atoms.

18. The film-forming auxiliary according to claim 16, wherein the total monomer components for the emulsion particle comprise 30 to 70% by mass of a (meth)acrylate having an alicyclic structure.

19. A film-forming auxiliary used in a fluorine resin emulsion, comprising an emulsion particle, wherein the emulsion particle comprises a polymer made of a monomer component comprising a reactive emulsifier, and the emulsion particle has three layers of an inner layer, a middle layer and an outer layer, and wherein the amount of a (meth)acrylate having an alicyclic structure used in the middle layer is 50 to 150 parts by mass based on 330 parts by mass of a monomer component for forming the middle layer.

20. A film-forming auxiliary used in a fluorine resin emulsion, comprising an emulsion particle, wherein the emulsion particle comprises a polymer made of a monomer component comprising a reactive emulsifier, and the emulsion particle has three layers of an inner layer, a middle layer and an outer layer, and the amount of a (meth)acrylate having an alicyclic structure used in the outer layer is 80 to 200 parts by mass based on 330 parts by mass of the monomer component for forming the outer layer.

* * * * *